(12) United States Patent
Hoshi et al.

(10) Patent No.: US 12,409,590 B2
(45) Date of Patent: Sep. 9, 2025

(54) MANUFACTURING APPARATUS, MANUFACTURING SYSTEM, AND MANUFACTURING METHOD

(71) Applicant: CANON KABUSHIKI KAISHA, Tokyo (JP)

(72) Inventors: Nobuharu Hoshi, Kanagawa (JP); Kazunori Suzuki, Saitama (JP); Akira Suzuki, Kanagawa (JP); Toshiteru Yamasaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 18/179,524

(22) Filed: Mar. 7, 2023

(65) Prior Publication Data

US 2023/0302697 A1    Sep. 28, 2023

(30) Foreign Application Priority Data

Mar. 23, 2022  (JP) ................................ 2022-046727

(51) Int. Cl.
*B29C 45/23* (2006.01)
*B29C 45/18* (2006.01)
(Continued)

(52) U.S. Cl.
CPC ............. *B29C 45/23* (2013.01); *B29C 45/18* (2013.01); *B29C 45/535* (2013.01); *B29C 2045/2683* (2013.01)

(58) Field of Classification Search
CPC ....... B29C 45/23; B29C 45/18; B29C 45/535; B29C 45/2073; B29C 45/27; B29C 45/28;
(Continued)

(56) References Cited

U.S. PATENT DOCUMENTS 6,045,740 A    4/2000  Goerlich
RE41,536 E *   8/2010  Hagelstein ............. B29C 45/27
                                                      425/549
(Continued)

FOREIGN PATENT DOCUMENTS

CN    105522699 A  *  4/2016
JP     2-223417 A      9/1990
(Continued)

OTHER PUBLICATIONS

18179524 JP201335229A, Hayashi, Feb. 21, 2013, machine translation to English. (Year: 2013).*
U.S. Appl. No. 18/184,059 filed Mar. 15, 2023, Suzuki et al.

*Primary Examiner* — Galen H Hauth
(74) *Attorney, Agent, or Firm* — VENABLE LLP

(57) ABSTRACT

A manufacturing apparatus includes a defining portion, a plunger, and a valve member. The defining portion defines a supply port, a discharge port, and a resin channel. The resin channel includes a reserving portion, a first partial channel connecting the supply port and the reserving portion, a second partial channel connecting the reserving portion and the discharge port, a relay channel connecting the first partial channel, the reserving portion and the second partial channel, and a connecting channel connecting the first partial channel and the second partial channel. The plunger discharges the molten resin reserved in the reserving portion. The valve member is provided in the connecting channel and the second partial channel. The first partial channel and the relay channel are connected to the connecting channel so as to intersect with the connecting channel. The valve member includes a first valve portion and a second valve portion.

23 Claims, 20 Drawing Sheets

(51) Int. Cl.
*B29C 45/26* (2006.01)
*B29C 45/53* (2006.01)

(58) Field of Classification Search
CPC ... B29C 45/231; B29C 45/2806; B29C 45/53; B29C 2045/2683
USPC ........................................................ 425/561
See application file for complete search history.

(56) References Cited

U.S. PATENT DOCUMENTS

| | | | |
|---|---|---|---|
| 2004/0109919 A1 | 6/2004 | Clarke et al. | |
| 2014/0272283 A1* | 9/2014 | Swenson | B32B 3/266 |
| | | | 264/328.8 |
| 2021/0114271 A1* | 4/2021 | Galati | B29C 45/2806 |

FOREIGN PATENT DOCUMENTS

| | | |
|---|---|---|
| JP | 6-31784 A | 2/1994 |
| JP | 6-254922 A | 9/1994 |
| JP | 7-40400 A | 2/1995 |
| JP | 9-141688 A | 6/1997 |
| JP | 10-100210 A | 4/1998 |
| JP | 2000141439 A | 5/2000 |
| JP | 2001-018258 A | 1/2001 |
| JP | 2001-205656 A | 7/2001 |
| JP | 2002-018883 A | 1/2002 |
| JP | 2005-280025 A | 10/2005 |
| JP | 2005-319711 A | 11/2005 |
| JP | 2010-264673 A | 11/2010 |
| JP | 201335229 * | 2/2013 |
| JP | 2013035229 A | 2/2013 |
| JP | 2015-166169 A | 9/2015 |

* cited by examiner

MANUFACTURING APPARATUS, MANUFACTURING SYSTEM, AND MANUFACTURING METHOD

BACKGROUND OF THE INVENTION

Field of the Invention

The present disclosure relates to manufacturing of a product.

Description of the Related Art

An injection molding apparatus capable of manufacturing a product by molding a plurality of molded articles or molding a plurality of molded articles on a workpiece by a single injection operation is generally known. To mold a plurality of molded articles simultaneously, a plurality of cavities corresponding to the shapes of the molded articles are defined in a mold, and molten resin is injected into the plurality of cavities simultaneously. If the plurality of cavities have the same shape, a plurality of molded articles having the same shape can be manufactured, and if the plurality of cavities have different shapes, a plurality of molded articles having different shapes can be manufactured. In addition, a molded article is manufactured by injecting molten resin into a single cavity through a plurality of discharge ports. In any of these cases, molten resin is discharged through a plurality of discharge ports. In the case of discharging molten resin through a plurality of discharge ports, the amount of molten resin discharged through each discharge port needs to be controlled.

Japanese Patent Laid-Open No. 2001-205656 discloses an injection molding apparatus in which discharge ports connected to respective cavities are each provided with a valve pin. In the injection molding apparatus described in Japanese Patent Laid-Open No. 2001-205656, the opening/closing timing of the discharge port by the valve pin is controlled in accordance with the capacity of each cavity, and thus the amount of molten resin injected into each cavity is controlled.

Each valve pin is configured to be driven by a driving mechanism including an electric motor, an air cylinder, or the like. In the case of controlling the amount or pressure of resin supplied to each cavity by controlling the opening/closing timing of each discharge port as described in Japanese Patent Laid-Open No. 2001-205656, an error such as a time lag between opening/closing timings of the discharge ports can occur. This error can cause variations in the amount of resin injected into respective cavities, or cause difference in the resin pressure in each cavity, which can affect the quality of the molded article. Similarly, also in the case of injecting molten resin into a single cavity through a plurality of discharge ports, the quality of the molded article can be affected.

SUMMARY OF THE INVENTION

According to a first aspect of the present invention, a manufacturing apparatus includes a defining portion, a plunger, and a valve member. The defining portion is configured to define a supply port through which molten resin is supplied, a discharge port through which the molten resin is discharged, and a resin channel connecting the supply port and the discharge port. The resin channel includes a reserving portion configured to reserve the molten resin, a first partial channel connecting the supply port and the reserving portion, a second partial channel connecting the reserving portion and the discharge port, a relay channel connecting the first partial channel and the reserving portion and connecting the reserving portion and the second partial channel, and a connecting channel connecting the first partial channel and the second partial channel. The plunger is movable to change a capacity of the reserving portion and is configured to discharge the molten resin reserved in the reserving portion from the discharge port by moving to reduce the capacity of the reserving portion. The valve member is provided in the connecting channel and the second partial channel and is movable in a channel direction of the second partial channel. The first partial channel and the relay channel are connected to the connecting channel so as to intersect with the connecting channel. The valve member includes a first valve portion configured to open and close the discharge port by moving in the channel direction, and a second valve portion configured to, in a case where the first valve portion has moved to a position to close the discharge port, open an exit of the molten resin of the first partial channel such that the first partial channel communicates with the relay channel, and in a case where the first valve portion has moved to a position to open the discharge port, close the exit of the first partial channel.

According to a second aspect of the present invention, a manufacturing apparatus includes a defining portion, a first plunger, a second plunger a first valve member, and a second valve member. The defining portion is configured to define a supply port through which molten resin is supplied, a first discharge port through which the molten resin is discharged, a second discharge port through which the molten resin is discharged, a first resin channel connecting the supply port and the first discharge port, and a second resin channel connecting the supply port and the second discharge port. The first resin channel includes a first reserving portion configured to reserve the molten resin. The second resin channel includes a second reserving portion configured to reserve the molten resin. The first plunger is movable to change a capacity of the first reserving portion and is configured to discharge the molten resin reserved in the first reserving portion from the first discharge port by moving to reduce the capacity of the first reserving portion. The second plunger is movable to change a capacity of the second reserving portion and is configured to discharge the molten resin reserved in the second reserving portion from the second discharge port by moving to reduce the capacity of the second reserving portion. The first resin channel includes a first partial channel connecting the supply port and the first reserving portion, a second partial channel connecting the first reserving portion and the first discharge port, and a first relay channel connecting the first partial channel and the first reserving portion and connecting the first reserving portion and the second partial channel. The second resin channel includes a third partial channel connecting the supply port and the second reserving portion, a fourth partial channel connecting the second reserving portion and the second discharge port, and a second relay channel connecting the third partial channel and the second reserving portion and connecting the second reserving portion and the fourth partial channel. The first plunger discharges the molten resin reserved in the first reserving portion from the first discharge port via the first relay channel and the second partial channel by moving to reduce a capacity of the first reserving portion. The second plunger discharges the molten resin reserved in the second reserving portion from the second discharge port via the second relay channel and the fourth partial channel by moving to reduce a capacity of the second reserving portion. The first valve member includes a first valve portion configured to open and close the first discharge port in a case where the first valve member moves, and a second valve portion configured to, in a case where the first valve portion has moved to a position to close the first discharge port, open an exit of the molten resin of the first partial channel such that the first partial channel communicates with the first relay channel, and in a case where the first valve portion has moved to a position to open the first discharge port, close the exit of the first partial channel. The second valve member includes a third valve portion configured to open and close the second discharge port in a case where the second valve member moves, and a fourth valve portion configured to, in a case where the third valve portion has moved to a position to close the second discharge port, open an exit of the molten resin of the third partial channel such that the third partial channel communicates with the second relay channel, and in a case where the third valve portion has moved to a position to open the second discharge port, close the exit of the third partial channel. The first partial channel is longer than the third partial channel.

According to a third aspect of the present invention, a manufacturing apparatus includes a defining portion, a first plunger, a second plunger, a first heater, and a second heater. The defining portion is configured to define a supply port through which molten resin is supplied, a first discharge port through which the molten resin is discharged, a second discharge port through which the molten resin is discharged, a first resin channel connecting the supply port and the first discharge port, and a second resin channel connecting the supply port and the second discharge port. The first resin channel includes a first reserving portion configured to reserve the molten resin, a first partial channel connecting the supply port and the first reserving portion, and a second partial channel connecting the first reserving portion and the first discharge port. The second resin channel includes a second reserving portion configured to reserve the molten resin, a third partial channel connecting the supply port and the second reserving portion, and a fourth partial channel connecting the second reserving portion and the second discharge port. The first plunger is movable to change a capacity of the first reserving portion and is configured to discharge the molten resin reserved in the first reserving portion from the first discharge port by moving to reduce the capacity of the first reserving portion. The second plunger is movable to change a capacity of the second reserving portion and is configured to discharge the molten resin reserved in the second reserving portion from the second discharge port by moving to reduce the capacity of the second reserving portion. The first heater is disposed along the second partial channel. The second heater is disposed along the fourth partial channel. The first plunger discharges the molten resin reserved in the first reserving portion from the first discharge port via the second partial channel by moving to reduce a capacity of the first reserving portion. The second plunger discharges the molten resin reserved in the second reserving portion from the second discharge port via the fourth partial channel by moving to reduce a capacity of the second reserving portion. The second partial channel is longer than the fourth partial channel. The first heater is longer than the second heater.

Further features of the present invention will become apparent from the following description of exemplary embodiments with reference to the attached drawings.

DESCRIPTION OF THE EMBODIMENTS

Exemplary embodiments of the present disclosure will be described below in detail with reference to drawings. The manufacturing apparatus according to the present disclosure can be applied to an injection molding apparatus that molds a product by injecting molten resin into a mold, and an injection molding apparatus in which a workpiece such as a molded part or a metal part is set in the apparatus and a product is molded by injecting molten resin onto the workpiece. For example, the product can be manufactured by insert molding, outsert molding, or two-color molding. Hereinafter, outsert molding will be described as an example.

First Embodiment

Figure 1:
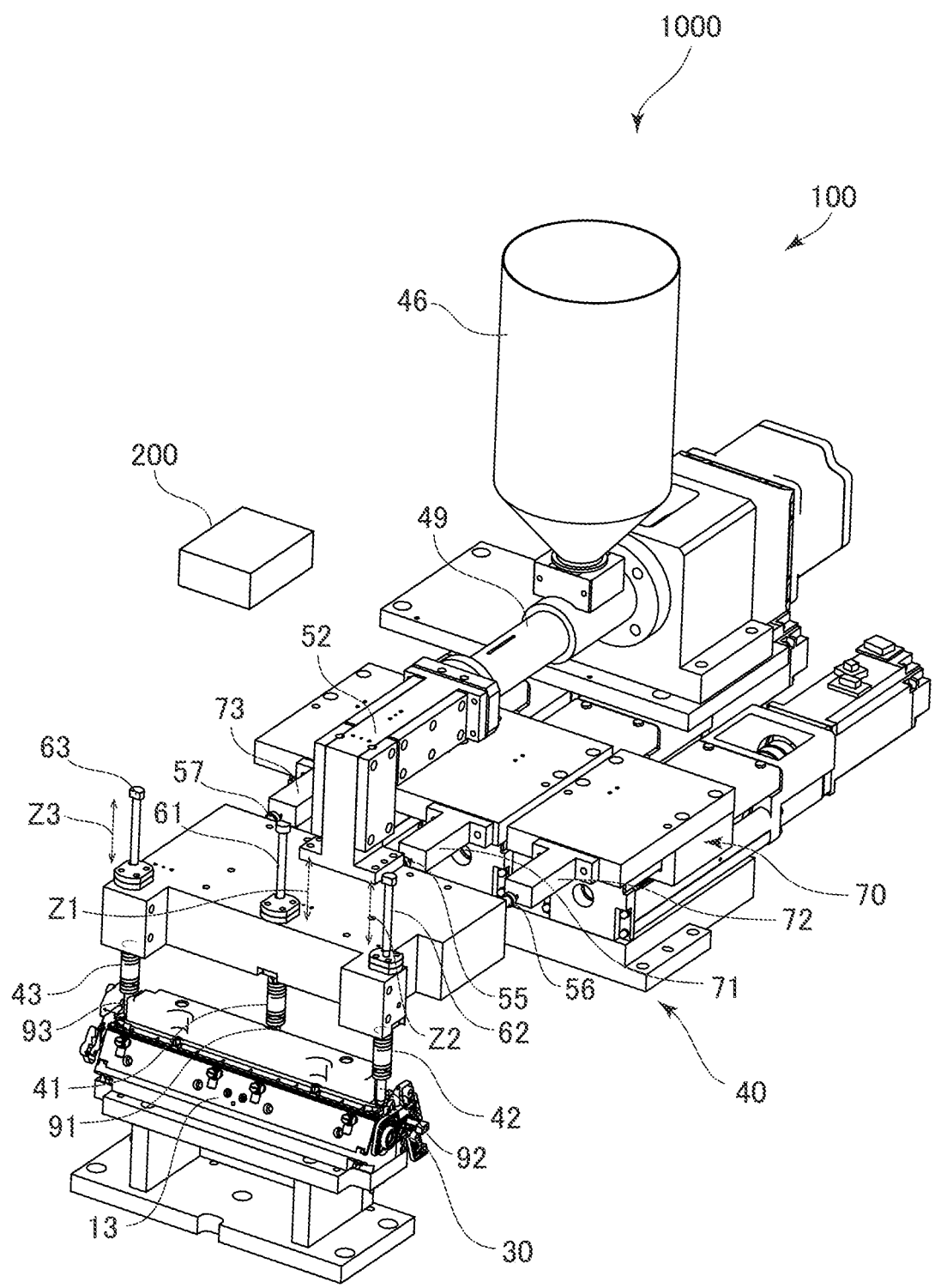
FIG. 1 is a perspective view of a manufacturing apparatus according to a first embodiment.

FIG. 1 is a perspective view of a manufacturing apparatus 1000 according to a first embodiment. The manufacturing apparatus 1000 is, for example, a small injection molding apparatus, and can be used in a manufacturing line for a product. To mold a small molded article, an injection molding apparatus of a pre-plunger type is suitable as a small injection molding apparatus. A case where the manufacturing apparatus 1000 is an injection molding apparatus of a pre-plunger type will be described. In an injection molding apparatus of a pre-plunger type, the amount of molten resin to be injected into a cavity is measured by reserving the molten resin in a cylinder defining a reserving portion.

The manufacturing apparatus 1000 of the first embodiment is used for manufacturing a product by outsert molding of a molded article at each of a plurality of positions on a workpiece 13. The product manufactured by the manufacturing apparatus 1000 may be an intermediate product or a final product.

The manufacturing apparatus 1000 includes an injection unit 100, a holding member 30 that holds the workpiece 13, and a control apparatus 200 that controls the injection unit 100. The control apparatus 200 is an example of a controller, and is constituted by, for example, one or a plurality of computers.

Figure 2:
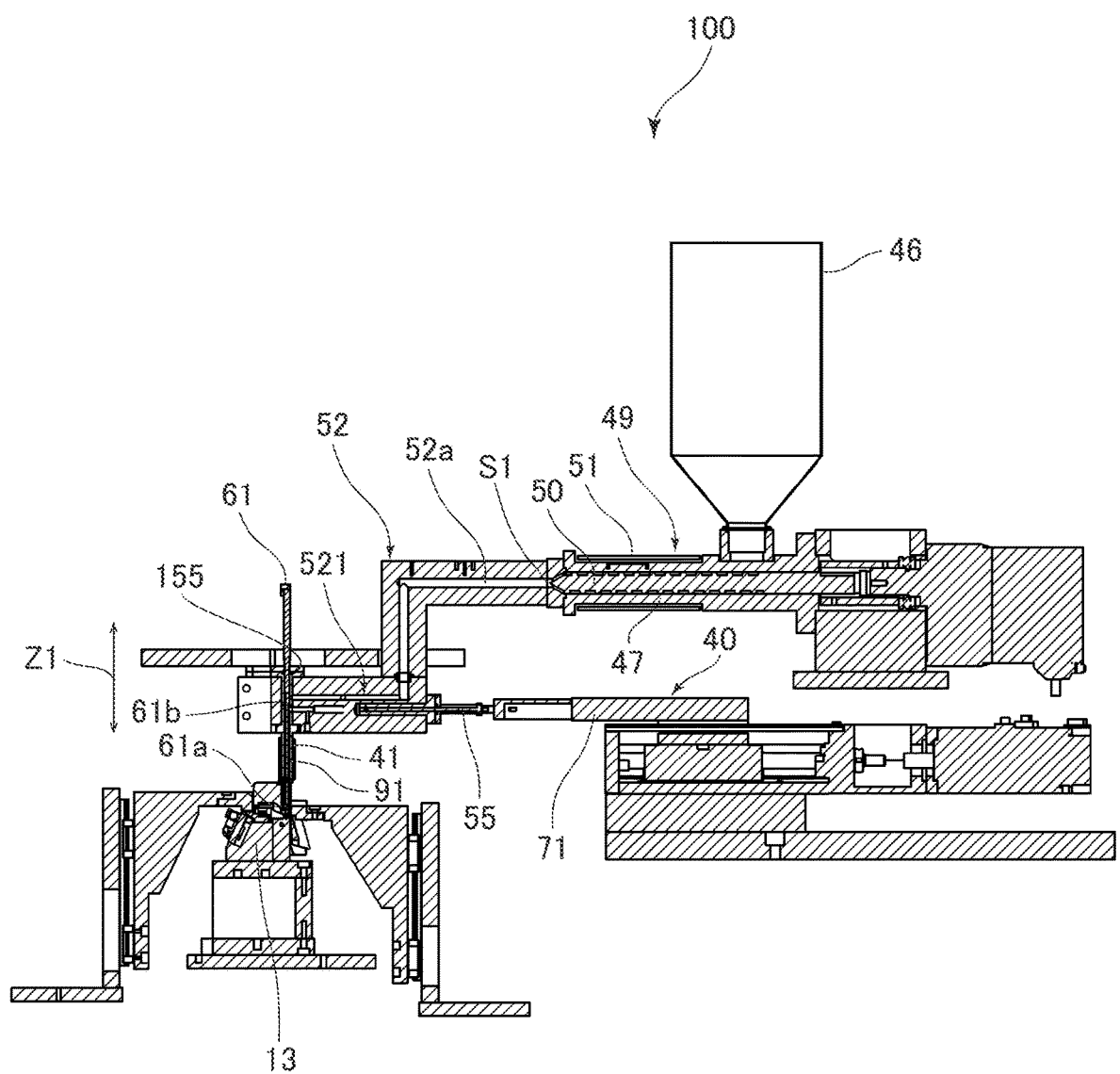
FIG. 2 is a longitudinal section view of an injection unit according to the first embodiment.

FIG. 2 is a longitudinal section view of the injection unit 100 according to the first embodiment. The injection unit 100 includes a resin supply portion 46, a plasticizing portion 49, a defining portion 52, and an injection portion 40. The resin supply portion 46 is, for example, a hopper. For example, a resin material of a pellet shape is charged into the resin supply portion 46. For example, the resin material is a thermoplastic resin. The resin material charged into the resin supply portion 46 is supplied to the plasticizing portion 49.

The plasticizing portion 49 is connected to a supply port S1 through which molten resin is supplied. The plasticizing portion 49 includes a cylinder 47 having a hollow cylindrical shape, a screw 50 disposed inside the cylinder 47, and a heater 51 disposed on the outer peripheral surface of the cylinder 47. A resin material is supplied into the cylinder 47 from the resin supply portion 46. The cylinder 47 is heated by the heater 51, and thus the resin material supplied into the cylinder 47 is heated. The resin material is heated, and thus conveyed by the screw 50 to the defining portion 52 while being plasticized and melted. The defining portion 52 includes a plurality of members defining a plurality of resin channels. The resin melted by the plasticizing portion 49, that is, molten resin is supplied to each resin channel. The direction in which the resin flows in the channel will be referred to as a channel direction. Typically, the channel direction of a channel coincides with the longitudinal direction of the channel. If the channel has a cylindrical shape, the channel direction of the channel coincides with the axial direction of the cylindrical shape.

Figure 3A:
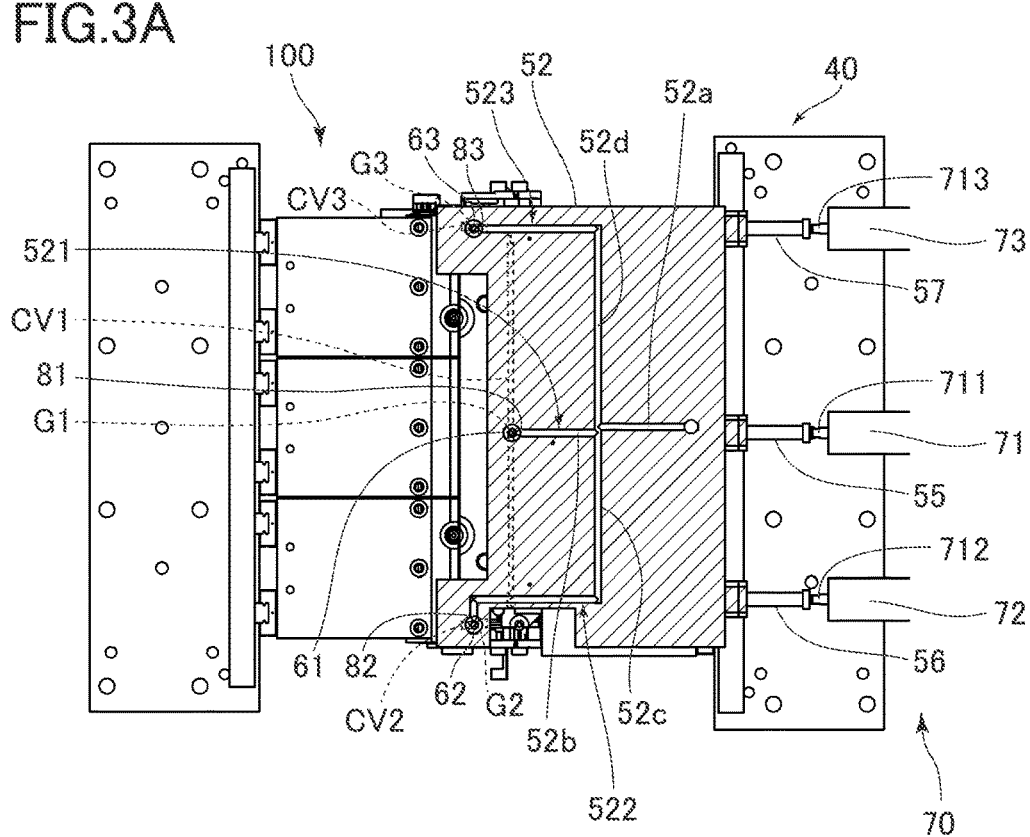
FIG. 3A is a plan view of the injection unit according to the first embodiment.
Figure 3B:
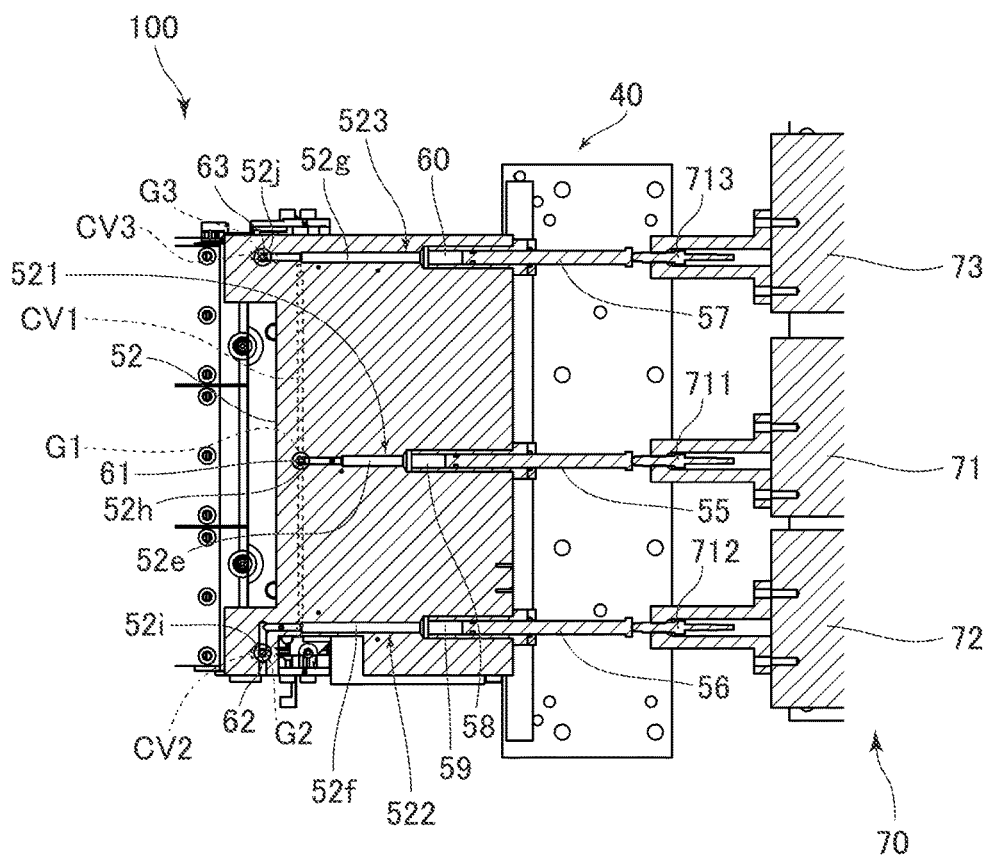
FIG. 3B is a plan view of the injection unit according to the first embodiment.

FIGS. 3A and 3B are plan views of the injection unit 100 according to the first embodiment. In each of FIGS. 3A and 3B, part of the injection unit 100 is illustrated in section view. In the first embodiment, as an example of a plurality of resin channels, three resin channels 521, 522, and 523 through which molten resin flows from a supply port S1 connected to the single plasticizing portion 49 to three discharge ports G1, G2, and G3 are defined by the defining portion 52. To be noted, the number of the resin channels is not limited to 3, and may be 2, 4, or more.

The resin channel 521 is an example of a first resin channel, and is a resin channel connecting the discharge port G1 and the supply port S1 connected to the plasticizing portion 49. The resin channel 522 is an example of a second resin channel, and is a resin channel connecting the discharge port G2 and the supply port S1 connected to the plasticizing portion 49. The resin channel 523 is an example of a third resin channel, and is a resin channel connecting the discharge port G3 and the supply port S1 connected to the plasticizing portion 49. In the first embodiment, a main channel 52a shared by the plurality of resin channels 521, 522, and 523 is defined by the defining portion 52. The main channel 52a is connected to the supply port S1 connected to the plasticizing portion 49.

The discharge ports G1, G2, and G3 are each a gate through which the molten resin is discharged. The discharge port G1 is an example of a first discharge port. The discharge port G2 is an example of a second discharge port. The discharge port G3 is an example of a third discharge port. The discharge port G1 is connected to a cavity CV1. The discharge port G2 is connected to a cavity CV2. The discharge port G3 is connected to a cavity CV3. The cavity CV1 is an example of a first cavity. The cavity CV2 is an example of a second cavity. The cavity CV3 is an example of a third cavity. The molten resin discharged from the discharge port G1 is injected into the cavity CV1, the molten resin discharged from the discharge port G2 is injected into the cavity CV2, and the molten resin discharged from the discharge port G3 is injected into the cavity CV3. The defining portion 52 is overall heated by the heater. For example, the cavities CV1, CV2, and CV3 are each defined by a mold and the workpiece 13.

Figure 4:
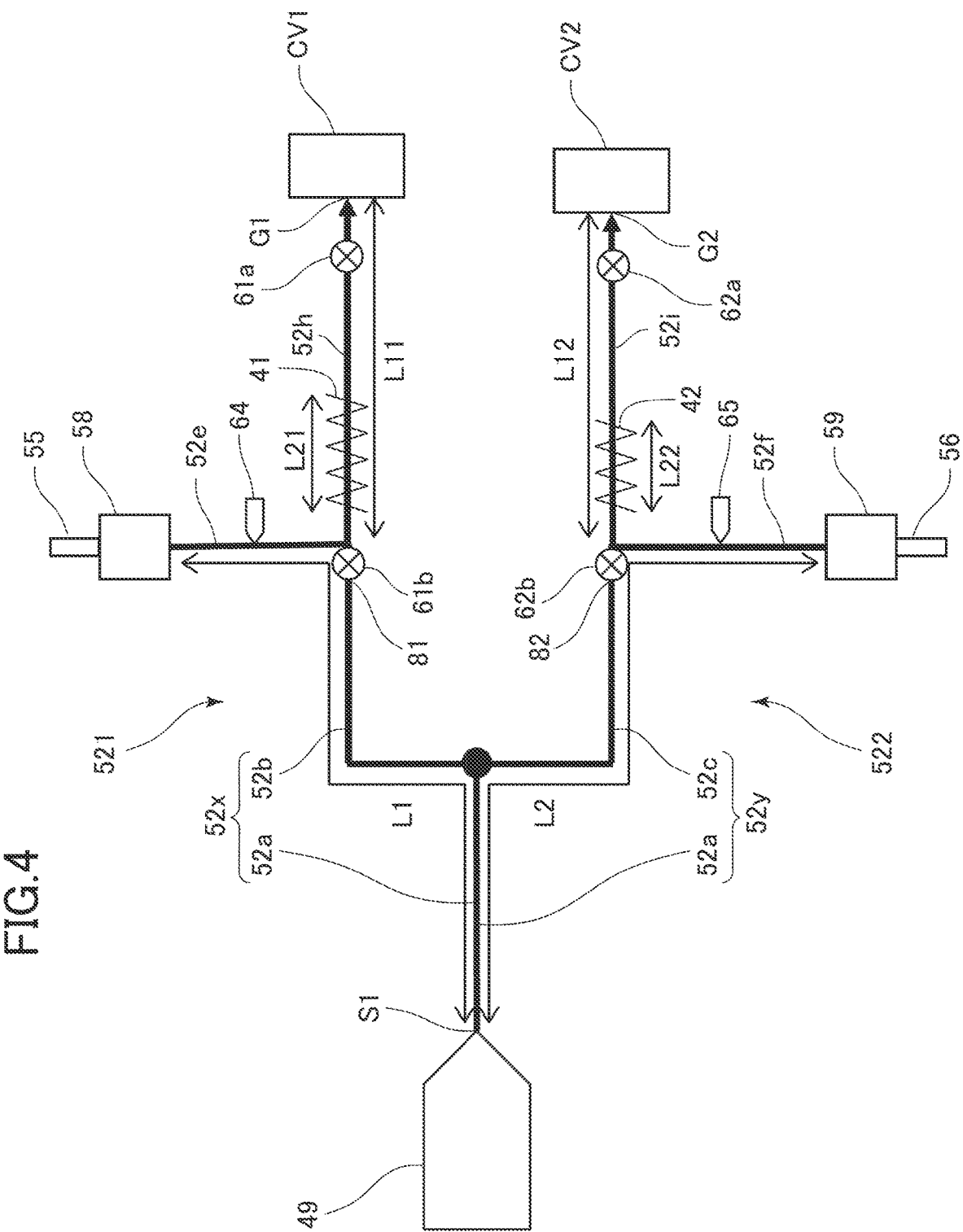
FIG. 4 is an explanatory diagram of two resin channels according to the first embodiment.

FIG. 4 is an explanatory diagram of the two resin channels 521 and 522 according to the first embodiment. To be noted, in FIG. 4, illustration of the resin channel 523 is omitted.

The resin channel 521 includes a reserving portion 58, a partial channel 52x, a partial channel 52e, and a partial channel 52h. The reserving portion 58 is an example of a first reserving portion, and is a space capable of reserving the molten resin supplied from the supply port S1 connected to the plasticizing portion 49. The partial channel 52x is an example of a first partial channel, and connects the reserving portion 58 and the supply port S1 connected to the plasticizing portion 49. The partial channel 52x includes the main channel 52a and a branch channel 52b. The branch channel 52b is an example of a first branch channel, and branches from the main channel 52a. The partial channel 52e is an example of a first relay channel, connects the reserving portion 58 and the branch channel 52b of the partial channel 52x, and connects the reserving portion 58 and the partial channel 52h. The partial channel 52h is an example of a second partial channel, and connects the partial channel 52e and the discharge port G1. That is, the partial channel 52h connects the reserving portion 58 and the discharge port G1.

The resin channel 522 includes a reserving portion 59, a partial channel 52y, a partial channel 52f, and a partial channel 52i. The reserving portion 59 is an example of a second reserving portion, and is a space capable of reserving the molten resin supplied from the supply port S1 connected to the plasticizing portion 49. The partial channel 52y is an example of a third partial channel, and connects the reserving portion 59 and the supply port S1 connected to the plasticizing portion 49. The partial channel 52y includes the main channel 52a and a branch channel 52c. The branch channel 52c is an example of a second branch channel, and branches from the main channel 52a. The partial channel 52f is an example of a second relay channel, connects the reserving portion 59 and the branch channel 52c of the partial channel 52y, and connects the reserving portion 59 and the partial channel 52i. The partial channel 52i is an example of a fourth partial channel, and connects the partial channel 52f and the discharge port G2. That is, the partial channel 52i connects the reserving portion 59 and the discharge port G2.

The resin channel 523 includes a reserving portion 60, a partial channel including the main channel 52a and a branch channel 52d, a partial channel 52g, and a partial channel 52j. The reserving portion 60 is an example of a third reserving portion, and is a space capable of reserving the molten resin supplied from the supply port S1 connected to the plasticizing portion 49. The partial channel including the main channel 52a and the branch channel 52d is an example of a fifth partial channel, and connects the reserving portion 60 and the supply port S1 connected to the plasticizing portion 49. The branch channel 52d is an example of a third branch channel, and branches from the main channel 52a. The partial channel 52g is an example of a third relay channel, connects the reserving portion 60 and the branch channel 52d, and connects the reserving portion 60 and the partial channel 52j. The partial channel 52j is an example of a sixth partial channel, and connects the partial channel 52g and the discharge port G3. That is, the partial channel 52j connects the reserving portion 60 and the discharge port G3.

As described above, the main channel 52a shared by the three resin channels 521, 522, and 523 is defined inside the defining portion 52. In addition, the three branch channels 52b, 52c, and 52d branching from the main channel 52a are defined inside the defining portion 52. The branch channels 52b, 52c, and 52d are each defined in a bent shape so as not to be linearly connected to the main channel 52a. As a result, a situation in which the flow of molten resin is concentrated on part of the branch channels, that is, a situation in which the resin pressure in part of the branch channels is too high can be suppressed.

In addition, the branch channels 52b, 52c, and 52d are each designed to have a different length. That is, as illustrated in FIG. 4, the total length L1 of the partial channel 52x and the partial channel 52e is different from the total length L2 of the partial channel 52y and the partial channel 52f.

The length of the partial channel 52e is larger than the diameter of the partial channel 52e. Further, the partial channel 52e is defined such that the sectional area of the channel increases stepwise toward the reserving portion 58. In addition, the length of the partial channel 52f is larger than the diameter of the partial channel 52f. Further, the partial channel 52f is defined such that the sectional area of the channel increases stepwise toward the reserving portion 59. The length of the partial channel 52g is larger than the diameter of the partial channel 52g. Further, the partial channel 52g is defined such that the sectional area of the channel increases stepwise toward the reserving portion 60. As a result of this, the reserving portions 58, 59, and 60 can smoothly reserve the molten resin.

To be noted, the partial channel 52e may be defined such that the sectional area of the channel continuously increases toward the reserving portion 58. In addition, the partial channel 52f may be defined such that the sectional area of the channel continuously increases toward the reserving portion 59. In addition, the partial channel 52g may be defined such that the sectional area of the channel continuously increases toward the reserving portion 60.

The injection portion 40 includes plungers 55, 56, and 57, a driving portion 70, valve pins 61, 62, and 63, and an unillustrated driving unit that drives the valve pins 61, 62, and 63.

The plunger 55 is an example of a first plunger, and is disposed in a cylinder of the defining portion 52 so as to be movable to change the capacity of the reserving portion 58. The plunger 55 is capable of injecting the molten resin reserved in the reserving portion 58 into the cavity CV1 from the discharge port G1 via the partial channels 52e and 52h by moving to reduce the capacity of the reserving portion 58.

The plunger 56 is an example of a second plunger, and is disposed in a cylinder of the defining portion 52 so as to be movable to change the capacity of the reserving portion 59. The plunger 56 is capable of injecting the molten resin reserved in the reserving portion 59 into the cavity CV2 from the discharge port G2 via the partial channels 52f and 52i by moving to reduce the capacity of the reserving portion 59.

The plunger 57 is an example of a third plunger, and is disposed in a cylinder of the defining portion 52 so as to be movable to change the capacity of the reserving portion 60. The plunger 57 is capable of injecting the molten resin reserved in the reserving portion 60 into the cavity CV3 from the discharge port G3 via the partial channels 52g and 52j by moving to reduce the capacity of the reserving portion 60.

As described above, the molten resin can be supplied to the plurality of cavities CV1, CV2, and CV3 via the plurality of resin channels 521, 522, and 523 from the single plasticizing portion 49, that is, from the single supply port S1. Further, the resin channel 521 includes the reserving portion 58, the resin channel 522 includes the reserving portion 59, the resin channel 523 includes the reserving portion 60, the reserving portion 58 includes the plunger 55, the reserving portion 59 includes the plunger 56, and the reserving portion 60 includes the plunger 57. As a result of this, molten resin corresponding to respective capacities of the cavities CV1, CV2, and CV3 can be respectively reserved in the reserving portions 58, 59, and 60, and can be respectively injected into the cavities CV1, CV2, and CV3 by the plungers 55, 56, and 57. As a result of this, molded articles respectively molded by the cavities CV1, CV2, and CV3 can be manufactured with high precision, and thus the quality of each molded article is improved. In the first embodiment, the plurality of molded articles molded on the workpiece 13 can be manufactured with high precision, and thus the quality of the manufactured product is improved. In addition, in the first embodiment, the resin channels 521, 522, and 523 are configured such that the molten resin is supplied from the single plasticizing portion 49 to the reserving portions 58, 59, and 60. As a result of this, a plurality of plasticizing portions corresponding to the plurality of reserving portions 58, 59, and 60 do not need to be provided, and thus the size of the manufacturing apparatus 1000, that is, the size of the injection unit 100 can be reduced.

The driving portion 70 is capable of individually driving the plungers 55, 56, and 57. In the first embodiment, the driving portion 70 includes a driving mechanism 71 capable of driving the plunger 55, a driving mechanism 72 capable of driving the plunger 56, and a driving mechanism 73 capable of driving the plunger 57. The driving mechanisms 71, 72, and 73 are capable of operating independently from each other. The driving portion 70, that is, the driving mechanisms 71, 72, and 73 operate by being controlled by the control apparatus 200. The driving mechanisms 71, 72, and 73 each include, for example, an electric mechanism such as a motor, or an air pressure mechanism such as an air cylinder.

The driving mechanism 71 includes a pressing member 711 capable of coming into contact with and out of contact from the plunger 55. The pressing member 711 is capable of pressing the plunger 55 so as to reduce the capacity of the reserving portion 58. The driving mechanism 72 includes a pressing member 712 capable of coming into contact with and out of contact from the plunger 56. The pressing member 712 is capable of pressing the plunger 56 so as to reduce the capacity of the reserving portion 59. The driving mechanism 73 includes a pressing member 713 capable of coming into contact with and out of contact from the plunger 57. The pressing member 713 is capable of pressing the plunger 57 so as to reduce the capacity of the reserving portion 60. The pressing member 711 is an example of a first pressing member. The pressing member 712 is an example of a second pressing member. The pressing member 713 is an example of a third pressing member.

The valve pins 61, 62, and 63 are valve members whose distal ends are valves (gate valves) that respectively open and close the discharge ports G1, G2, and G3. The valve pin 61 is an example of a first valve member. The valve pin 62 is an example of a second valve member. The valve pin 63 is an example of a third valve member. As illustrated in FIG. 1, the valve pin 61 is a rod-like member extending in an axial direction Z1. The valve pin 62 is a rod-like member extending in an axial direction Z2. The valve pin 63 is a rod-like member extending in an axial direction Z3. Although the axial directions Z1, Z2, and Z3 are parallel to each other in the first embodiment, these directions may intersect with each other.

The distal end of the valve pin 61 in the axial direction Z1 is a valve portion 61a that opens and closes the discharge port G1 by moving in the axial direction Z1. The distal end of the valve pin 62 in the axial direction Z2 is a valve portion 62a that opens and closes the discharge port G2 by moving in the axial direction Z2. The distal end of the valve pin 63 in the axial direction Z3 is a valve portion that opens and closes the discharge port G3 by moving in the axial direction Z3. The valve pins 61, 62, and 63 are respectively driven in the axial directions Z1, Z2, and Z3 by an unillustrated driving unit. The unillustrated driving unit includes, for example, an electric mechanism such as a motor, or an air pressure mechanism such as an air cylinder.

The valve pin 61 is provided in the partial channel 52h, the valve pin 62 is provided in the partial channel 52i, and the valve pin 63 is provided in the partial channel 52j. The distal end of the partial channel 52h in the axial direction Z1 is the discharge port G1. The distal end of the partial channel 52i in the axial direction Z2 is the discharge port G2. The distal end of the partial channel 52j in the axial direction Z3 is the discharge port G3.

The partial channel 52h is a channel used for supplying the molten resin from the reserving portion 58 to the cavity CV1. The partial channel 52i is a channel used for supplying the molten resin from the reserving portion 59 to the cavity CV2. The partial channel 52j is a channel used for supplying the molten resin from the reserving portion 60 to the cavity CV3. The injection unit 100 includes a heater 41 illustrated in FIG. 1 disposed along the partial channel 52h, a heater 42 illustrated in FIG. 1 disposed along the partial channel 52i, and a heater 43 illustrated in FIG. 1 disposed along the partial channel 52j. The heater 41 is an example of a first heater. The heater 42 is an example of a second heater. The heater 43 is an example of a third heater. The heater 41 is disposed on the outer peripheral surface of a protruding member 91 having a cylindrical shape and defining the partial channel 52h in the defining portion 52. The heater 42 is disposed on the outer peripheral surface of a protruding member 92 having a cylindrical shape and defining the partial channel 52i in the defining portion 52. The heater 43 is disposed on the outer peripheral surface of a protruding member 93 having a cylindrical shape and defining the partial channel 52j in the defining portion 52.

The positions of the discharge ports G1, G2, and G3 in a height direction, that is, the lengths of the partial channels 52h, 52i, and 52j are set in accordance with the positions of the cavities CV1, CV2, and CV3, that is, the positions where the molded articles are to be molded on the workpiece 13. Therefore, the partial channels 52h, 52i, and 52j can be set to different lengths. Therefore, the lengths of the heaters 41, 42, and 43 are respectively set in accordance with the lengths of the partial channels 52h, 52i, and 52j.

In the example of the first embodiment, the partial channel 52h is longer than the partial channel 52i. Therefore, the heater 41 is set to be longer than the heater 42. In the first embodiment, the length of the partial channel 52h is the length of the partial channel 52h in the axial direction Z1, and the length of the partial channel 52i is the length of the partial channel 52i in the axial direction Z2. In addition, in the first embodiment, the length of the heater 41 is the length of the heater 41 in the axial direction Z1, and the length of the heater 42 is the length of the heater 42 in the axial direction Z2. When the length of the partial channel 52h is L11 and the length of the partial channel 52i is L12, L11>L12 holds. In addition, when the length of the heater 41 is L21 and the length of the heater 42 is L22, L21>L22 holds.

The molten resin that flows in the partial channels 52h, 52i, and 52j and is supplied to the cavities CV1, CV2, and CV3 is held at a predetermined temperature by the heaters 41, 42, and 43, and thus a good molten state can be maintained.

The valve pin 61 includes a valve portion 61b that opens and closes an exit of the molten resin of the partial channel 52x, that is, opens and closes an exit 81 of the molten resin of the branch channel 52b. The valve pin 62 includes a valve portion 62b that opens and closes an exit of the molten resin of the partial channel 52y, that is, opens and closes an exit 82 of the molten resin of the branch channel 52c. The valve section 62b has substantially the same configuration as the valve section 61b. To be noted, although the illustration thereof is omitted, the valve pin 63 includes a valve portion having a similar configuration to the valve portions 61b and 62b that opens and closes an exit 83 of the molten resin of the branch channel 52d.

The configurations of the valve portion 62b of the valve pin 62 and the valve portion of the valve pin 63 are similar to the configuration of the valve portion 61b of the valve pin 61, and therefore the valve pin 61b will be described below. Here, the valve portion 61a of the valve pin 61 is an example of a first valve portion, and the valve portion 61b of the valve pin 61 is an example of a second valve portion. The valve portion 62a of the valve pin 62 is an example of a third valve portion, and the valve portion 62b of the valve pin 62 is an example of a fourth valve portion.

Figure 5:
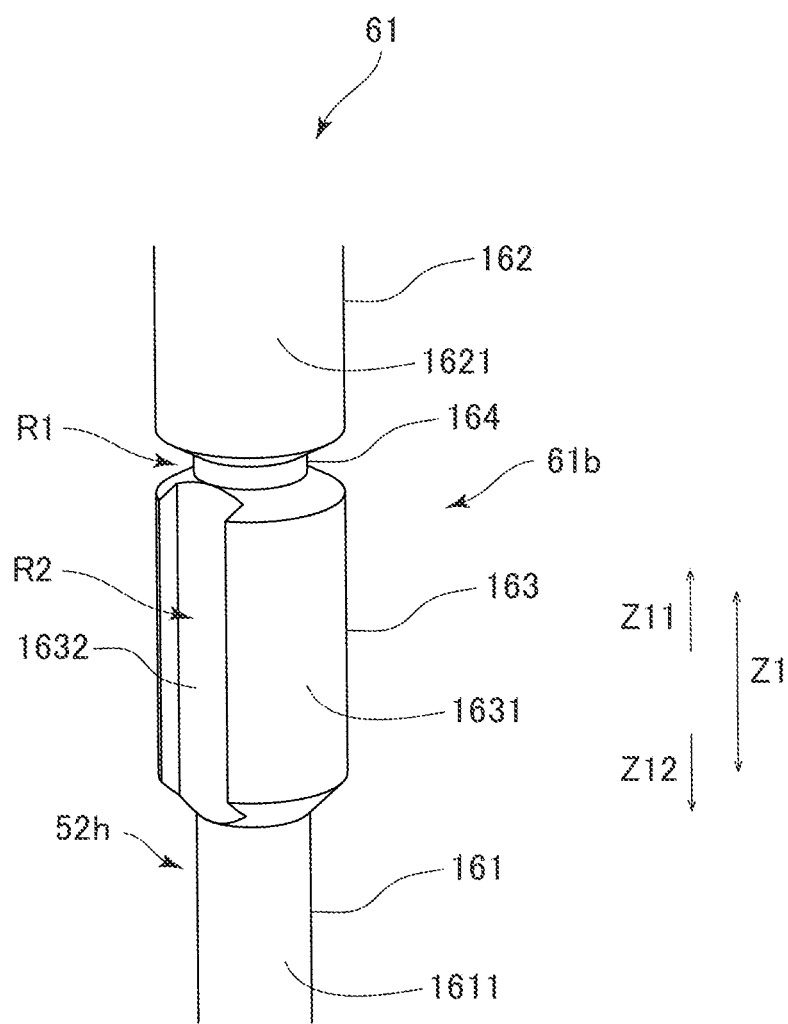
FIG. 5 is a perspective view of part of a valve pin according to the first embodiment.
Figure 6A:
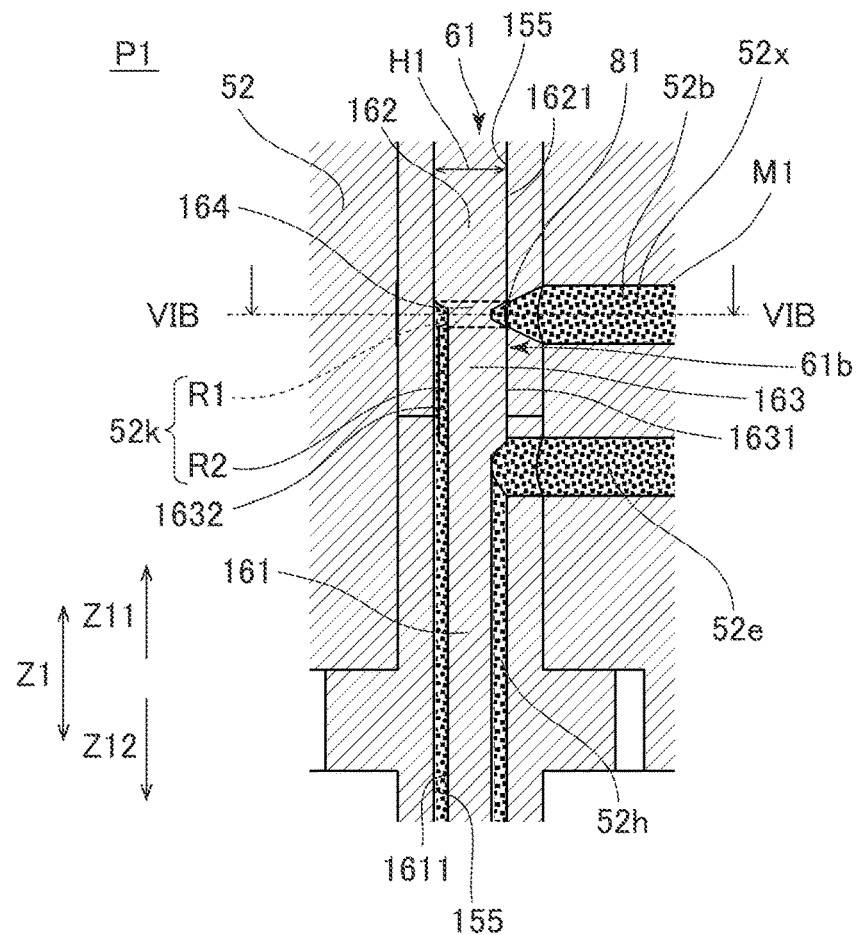
FIG. 6A is a section view of a second valve portion and the vicinity thereof according to the first embodiment.
Figure 6B:
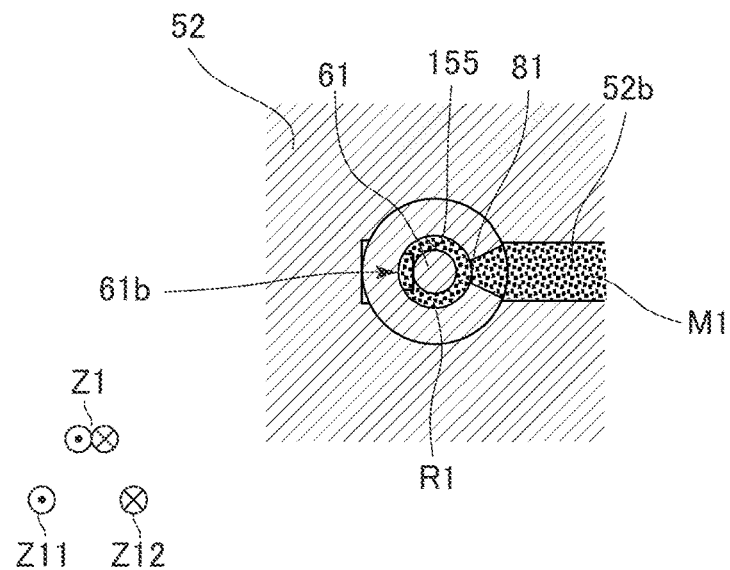
FIG. 6B is a section view of the second valve portion and the vicinity thereof according to the first embodiment.
Figure 7A:
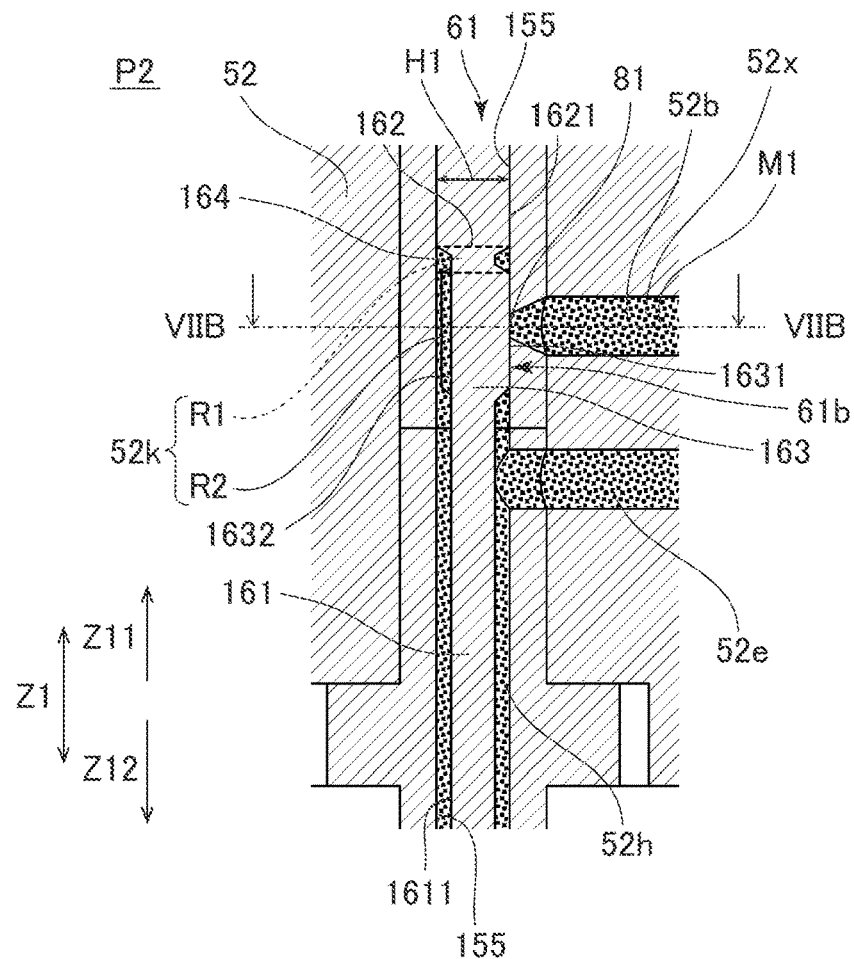
FIG. 7A is a section view of the second valve portion and the vicinity thereof according to the first embodiment.
Figure 7B:
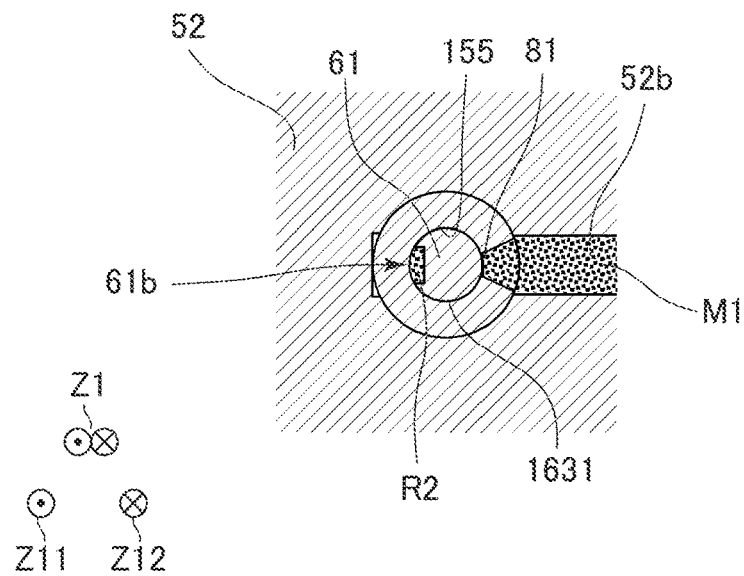
FIG. 7B is a section view of the second valve portion and the vicinity thereof according to the first embodiment.

FIG. 5 is a perspective view of part of the valve pin 61 according to the first embodiment. FIG. 6A is a section view of the valve portion 61b and the vicinity thereof in FIG. 2. FIG. 6A illustrates a state in which the valve portion 61a of the valve pin 61 has moved to a closed position P1 to close the discharge port G1. FIG. 6B is a section view of the valve portion 61b and the vicinity thereof taken along a line VIB-VIB of FIG. 6A. FIG. 7A is a section view of the valve portion 61b and the vicinity thereof in FIG. 2. FIG. 7A illustrates a state in which the valve portion 61a of the valve pin 61 has moved to an open position P2 to close the discharge port G1. FIG. 7B is a section view of the valve portion 61b and the vicinity thereof taken along a line VIIB-VIIB of FIG. 7A.

The defining portion 52 includes an inner peripheral surface 155 defining a hole H1 extending in the axial direction Z1. The inner peripheral surface 155 is also a surface defining a connecting channel 52k and the partial channel 52h. The connecting channel 52k is a channel connecting the partial channel 52x and the partial channel 52h. The valve pin 61 is inserted in the hole H1 defined by the inner peripheral surface 155, and is movable in the axial direction Z1 along the inner peripheral surface 155. Therefore, the valve portion 61b that is part of the valve pin 61 is slidable in the axial direction Z1 in the hole H1 defined by the inner peripheral surface 155.

Part of the hole H1 is the partial channel 52h and the connecting channel 52k. In addition, the branch channel 52b of the partial channel 52x and the partial channel 52e are connected to the hole H1, that is, connected to the connecting channel 52k while intersecting with the connecting channel 52k. In the first embodiment, the branch channel 52b and the partial channel 52e are orthogonally connected to the hole H1, that is, to the connecting channel 52k. In the inner peripheral surface 155, the exit of the molten resin of the partial channel 52x, that is, the resin exit 81 of the molten resin of the branch channel 52b is provided.

The valve pin 61, that is, the valve portion 61a and the valve portion 61b are slidable in, among the axial direction Z1, a direction Z11 for moving away from the discharge port G1 and a direction Z12 for moving closer to the discharge port G1. The direction Z12 is opposite to the direction Z11. As a result of the valve pin 61 sliding in the axial direction Z1, the valve portion 61a is capable of moving to the closed position P1 where to close the discharge port G1, and an open position P2 to open the discharge port G1. The valve portion 61a moves from the closed position P1 to the open position P2 by sliding in the direction Z11. In addition, the valve portion 61a moves from the open position P2 to the closed position P1 by sliding in the direction Z12.

The valve pin 61 includes a columnar portion 161 extending in the axial direction Z1, and a columnar portion 162 extending in the axial direction Z1. The valve portion 61b is provided between the columnar portions 161 and 162. The columnar portion 161 is disposed on the discharge port G1 side with respect to the columnar portion 162 and the valve portion 61b, and the distal end of the columnar portion 161 in the axial direction Z1 opens and closes the discharge port G1 when the valve pin 61 moves in the axial direction Z1. That is, the distal end of the columnar portion 161 in the axial direction Z1 serves as the valve portion 61a that opens and closes the discharge port G1.

The columnar portion 162 has a larger diameter than the columnar portion 161. The columnar portion 162 is fitted to the inner peripheral surface 155 of the defining portion 52 so as to be slidable in the axial direction Z1. That is, an outer peripheral surface 1621 of the columnar portion 162 is in contact with the inner peripheral surface 155 of the defining portion 52.

The columnar portion 161 is disposed so as not to be in contact with the inner peripheral surface 155 of the defining portion 52, and a space between the inner peripheral surface 155 of the defining portion 52 and an outer peripheral surface 1611 of the columnar portion 161 serves as the partial channel 52h.

The valve portion 61b includes a columnar portion 163 having the same diameter as the columnar portion 162, and a columnar portion 164 having a smaller diameter than the columnar portions 162 and 163. The columnar portions 163 and 164 are disposed between the columnar portion 161 and the columnar portion 162. An outer peripheral surface 1631 of the columnar portion 163 is a columnar surface, and is in contact with the inner peripheral surface 155 of the defining portion 52 so as to be slidable in the axial direction Z1.

The columnar portion 164 is disposed between the columnar portion 163 and the columnar portion 162. Therefore, an annular groove is defined between the columnar portions 162 and 163, and an annular space R1 corresponding to the annular groove is defined between the columnar portion 164 and the inner peripheral surface 155 of the defining portion 52. A groove portion 1632 extending in the axial direction Z1 is provided on the columnar portion 163 such that the space R1 and the partial channel 52h communicate with each other. A space R2 connected to the space R1 and the partial channel 52h is defined between the groove portion 1632 and the inner peripheral surface 155 of the defining portion 52. The connecting channel 52k includes the spaces R1 and R2. To be noted, the columnar portions 161 to 164 of the valve pin 61 each may or may not have a hollow shape.

When the valve portion 61a of the valve pin 61 moves to the closed position P1 as illustrated in FIG. 6A, the outer peripheral surface 1631 moves to a position to open the exit 81 of the branch channel 52b. As a result of this, the partial channel 52x communicates with the partial channel 52e of the partial channel 52h via the connecting channel 52k. At this time, since the discharge port G1 is closed by the valve portion 61a of the valve pin 61, molten resin M1 having flowed through the branch channel 52b of the partial channel 52x flows into the reserving portion 58 via the connecting channel 52k and the partial channel 52e, and is thus reserved in the reserving portion 58.

In addition, when the valve portion 61a of the valve pin 61 moves to the open position P2 as illustrated in FIG. 7A, the space R1, that is, the connecting channel 52k is displaced in the direction Z11 with respect to the exit 81, and the outer peripheral surface 1631 moves to a position to close the exit 81 of the branch channel 52b. At this time, the discharge port G1 is open, and therefore the molten resin M1 reserved in the reserving portion 58 is discharged from the discharge port G1 via the partial channel 52e and the partial channel 52h by moving the plunger 55 to reduce the capacity of the reserving portion 58.

In the first embodiment, the branch channel 52b opened and closed by the valve portion 61b is connected to the hole H1, that is, the connecting channel 52k so as to intersect therewith. Therefore, the outer peripheral surface 1631 of the valve portion 61b receives the pressure of the molten resin M1 staying in the branch channel 52b not in the axial direction Z1 but in a direction intersecting with the axial direction Z1. The axial direction Z1 is a driving direction of the valve pin 61. In the example of FIG. 7A, the outer peripheral surface 1631 of the valve portion 61b receives the pressure of the molten resin M1 staying in the branch channel 52b in a direction orthogonal to the axial direction Z1.

Therefore, movement of the valve pin 61, that is, the valve portion 61b in the axial direction Z1, specifically the direction Z12 is suppressed by the pressure of the molten resin M1 staying in the branch channel 52b. As a result of this, the valve portion 61a is held at the open position P2 to open the discharge port G1 with high precision, and in addition, leakage of the molten resin M1 from the branch channel 52b to the partial channel 52h at the valve portion 61b can be suppressed.

In addition, the outer peripheral surface 1631 is a columnar surface extending straight in the axial direction Z1, and thus can be easily manufactured with high precision. The inner peripheral surface 155 defining the hole H1 is also a columnar surface extending straight in the axial direction Z1, and thus can be easily manufactured with high precision. Therefore, leakage of the molten resin between the branch channel 52b and the partial channels 52e and 52h through a gap between the outer peripheral surface 1631 and the inner peripheral surface 155 can be effectively reduced.

As a result of the valve portion 61b having the configuration described above, the variation in the amount of molten resin injected from the discharge port G1 into the cavity CV1 with respect to the capacity of the cavity CV1 is reduced, and the quality of the molded article to be molded, that is, the quality of the product is improved.

In the manufacturing apparatus 1000 of the first embodiment, products are sequentially manufactured by repeating an amount measuring step, an injection step, and a cooling step. To be noted, in these steps, the operation of the plungers 56 and 57 is approximately the same as the operation of the plunger 55, and the operation of the valve pins 62 and 63 is approximately the same as the operation of the valve pin 61. Therefore, only the operation of the plunger 55 and the valve pin 61 will be described below, and description of the operation of the plungers 56 and 57 and the operation of the valve pins 62 and 63 will be omitted.

Figure 8:
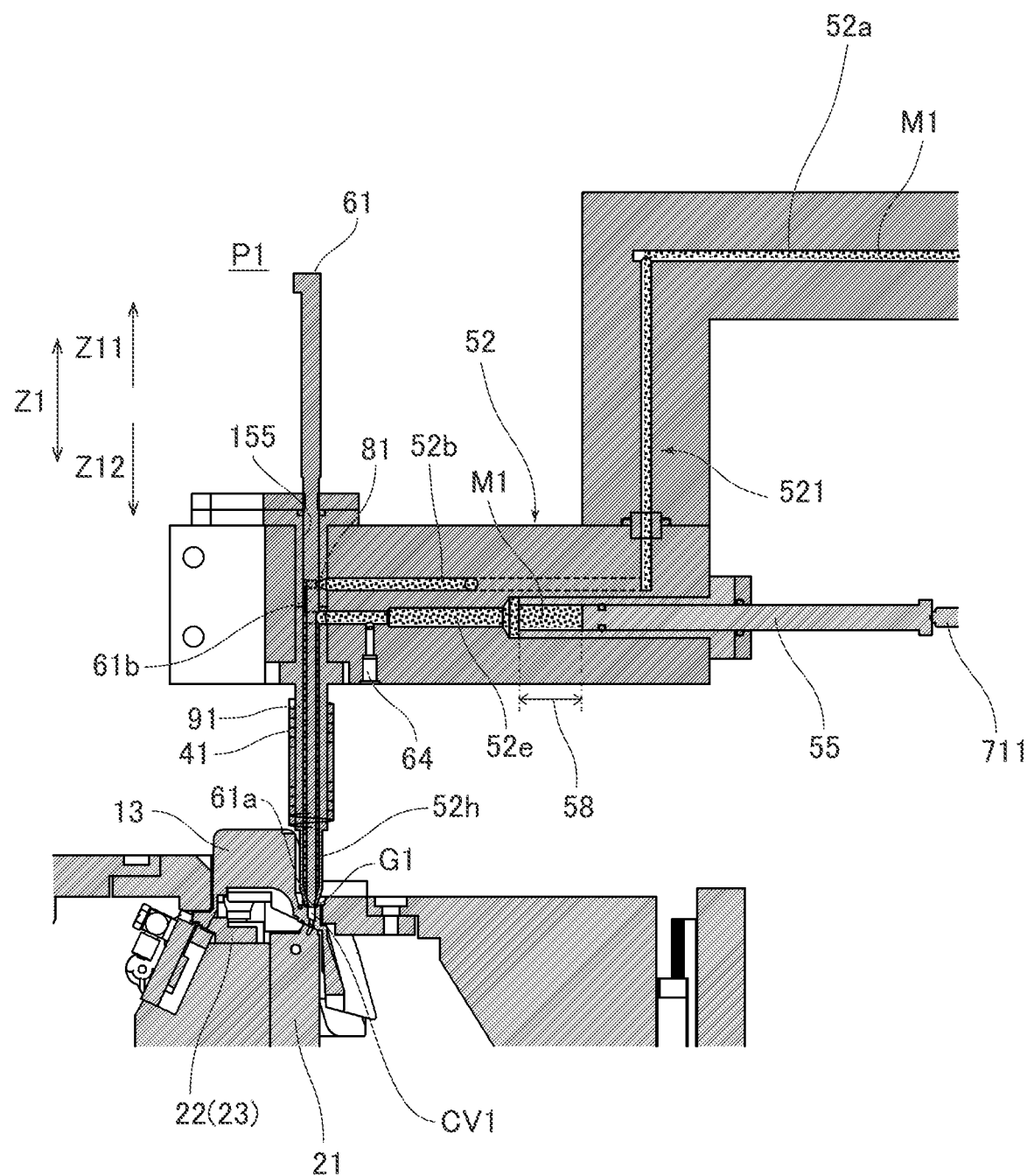
FIG. 8 is a longitudinal section view of the injection unit according to the first embodiment.

FIG. 8 is a longitudinal section view of the injection unit 100 according to the first embodiment. FIG. 8 illustrates a state in which the amount measuring step is completed.

Here, before the amount measuring step is started, the control apparatus 200 performs drive control of the valve pin 61 to move the valve portion 61a of the closed position P1 and move the valve portion 61b to the open position. As a result of this, the valve portion 61a closes the discharge port G1, and the valve portion 61b opens the exit 81 of the branch channel 52b. The connecting channel 52k illustrated in FIG. 6A connecting the branch channel 52b and the partial channel 52e is formed by the valve portion 61b. Further, in the amount measuring step, the molten resin M1 discharged from the plasticizing portion 49 is injected into the reserving portion 58 through the main channel 52a, the branch channel 52b, the connecting channel 52k, and the partial channel 52e.

Figure 9:
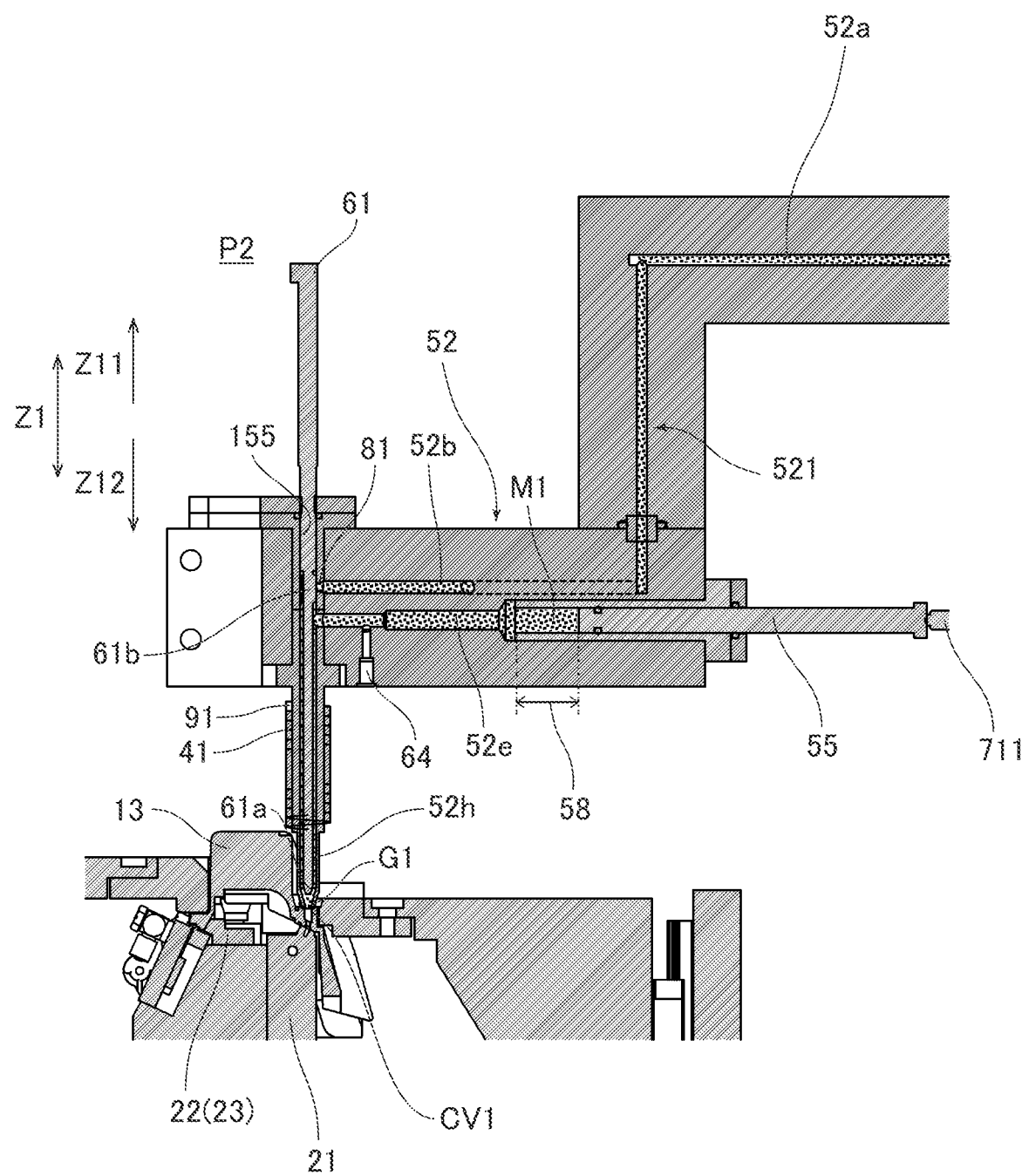
FIG. 9 is a longitudinal section view of the injection unit according to the first embodiment.

FIG. 9 is a longitudinal section view of the injection unit 100 according to the first embodiment. FIG. 9 illustrates a state in which the injection step is started. After the injection of the molten resin M1 into the reserving portion 58 is completed, that is, after the amount measuring step is completed, the control apparatus 200 performs drive control of the valve pin 61 to move the valve portion 61a to the open position P2 and move the valve portion 61b to the closed position as illustrated in FIG. 9. As a result of this, the valve portion 61a opens the discharge port G1, and the valve portion 61b closes the exit 81 of the branch channel 52b.

Figure 10:
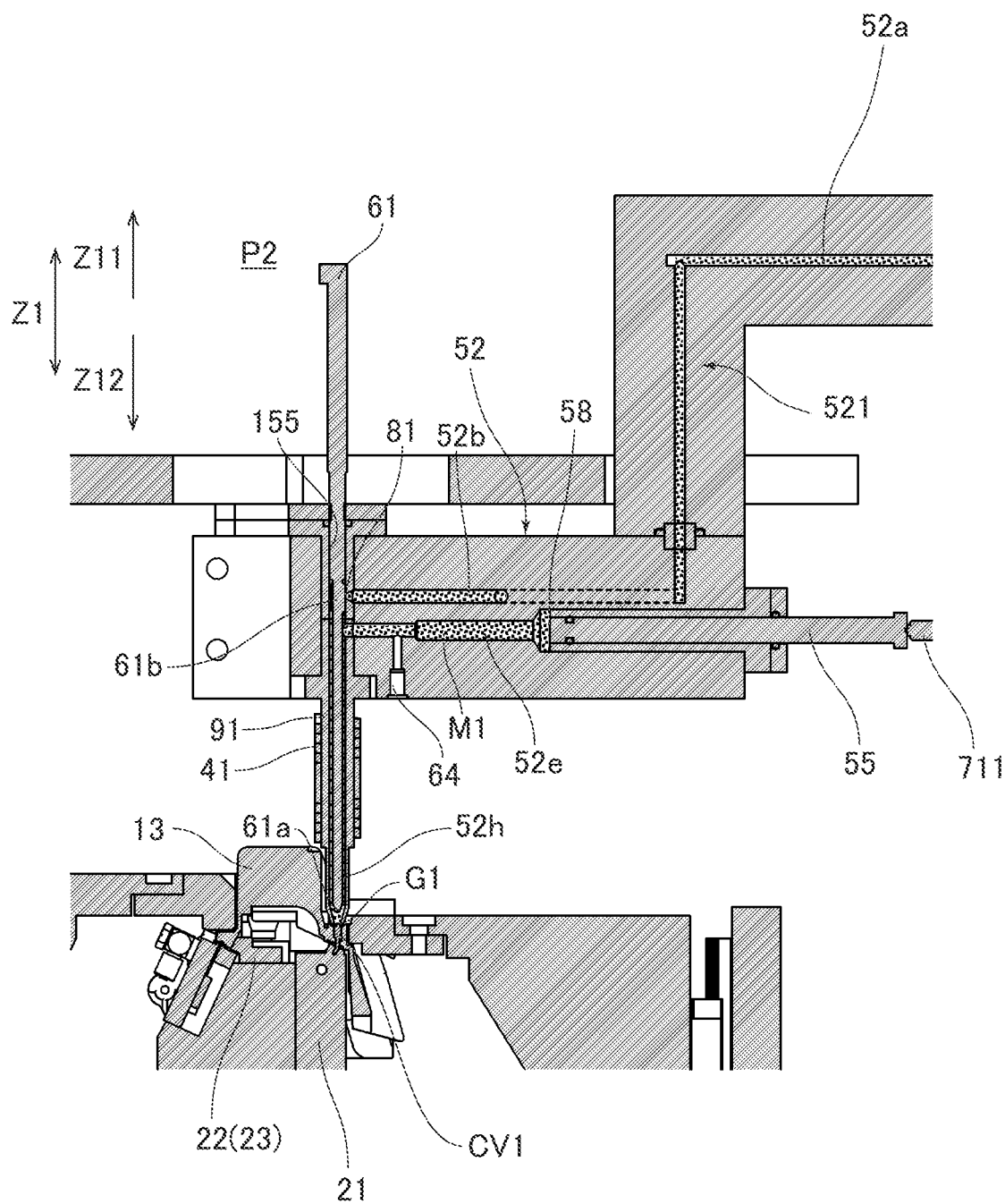
FIG. 10 is a longitudinal section view of the injection unit according to the first embodiment.

FIG. 10 is a longitudinal section view of the injection unit 100 according to the first embodiment. FIG. 10 illustrates a state in which the injection step is completed. In the injection step, the control apparatus 200 controls the driving mechanism 71 to cause the plunger 55 to push out the molten resin M1 injected into the reserving portion 58. That is, the control apparatus 200 drives the plunger 55 to move the plunger 55 to reduce the capacity of the reserving portion 58. By moving the plunger 55 in this manner, the molten resin M1 reserved in the reserving portion 58 is injected into the cavity CV1 from the discharge port G1 via the partial channel 52e and the partial channel 52h.

At this time, the valve portion 61b closes the branch channel 52b, and therefore the molten resin M1 flowing back to the branch channel 52b, that is, to the plasticizing portion 49 can be suppressed. Therefore, the molten resin M1 injected into the reserving portion 58 and measured to a predetermined amount can be stably discharged from the discharge port G1.

In addition, the partial channel 52e has such a shape that the sectional area thereof increases stepwise toward the plunger 55, that is, such a shape that the sectional area thereof decreases stepwise toward the discharge port G1. As described above, as compared with a case where the channel suddenly becomes narrow, when driving the plunger 55, the driving force thereof is efficiently transmitted to the molten resin M1, and the pressure loss of the molten resin M1 in the section from the partial channel 52e to the discharge port G1 is reduced. Therefore, the molten resin M1 can be injected into the cavity CV1 at a desired pressure.

After the injection step is completed, the amount measuring step of measuring the amount of the molten resin for next injection is performed in parallel with a cooling step of cooling the molten resin M1 injected into the cavity CV1.

Figure 11:
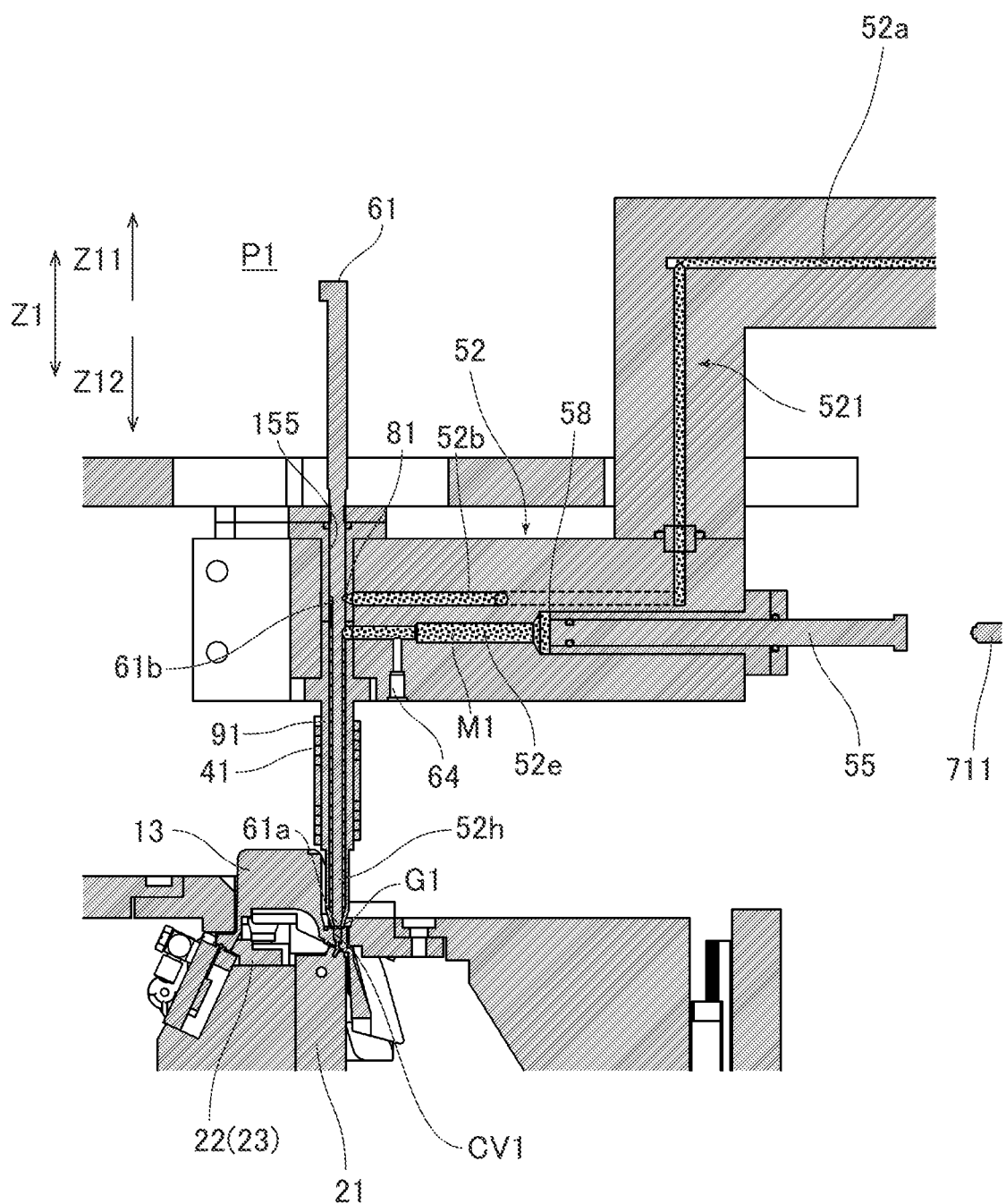
FIG. 11 is a longitudinal section view of the injection unit according to the first embodiment.

FIG. 11 is a longitudinal section view of the injection unit 100 according to the first embodiment. FIG. 11 illustrates a state in which the amount measuring step is started. As illustrated in FIG. 11, the control apparatus 200 performs drive control of the valve pin 61 to move the valve portion 61a to the closed position P1 and move the valve portion 61b to the open position. As a result of this, the valve portion 61a closes the discharge port G1, and the valve portion 61b opens the exit 81 of the branch channel 52b. The connecting channel 52k connecting the branch channel 52b and the partial channel 52e is formed by the valve portion 61b. In addition, the control apparatus 200 controls the driving mechanism 71 and retracts the pressing member 711 to a position away from the plunger 55.

Further, in the amount measuring step, the control apparatus 200 rotates the screw 50 of the plasticizing portion 49. As a result of this, molten resin is discharged from the plasticizing portion 49. The molten resin M1 discharged from the plasticizing portion 49 is injected into the reserving portion 58 through the main channel 52a, the branch channel 52b, the connecting channel 52k, and the partial channel 52e. At this time, the plunger 55 is pressed by the molten resin M1 supplied to the reserving portion 58, and thus moves closer to the pressing member 711.

Figure 12:
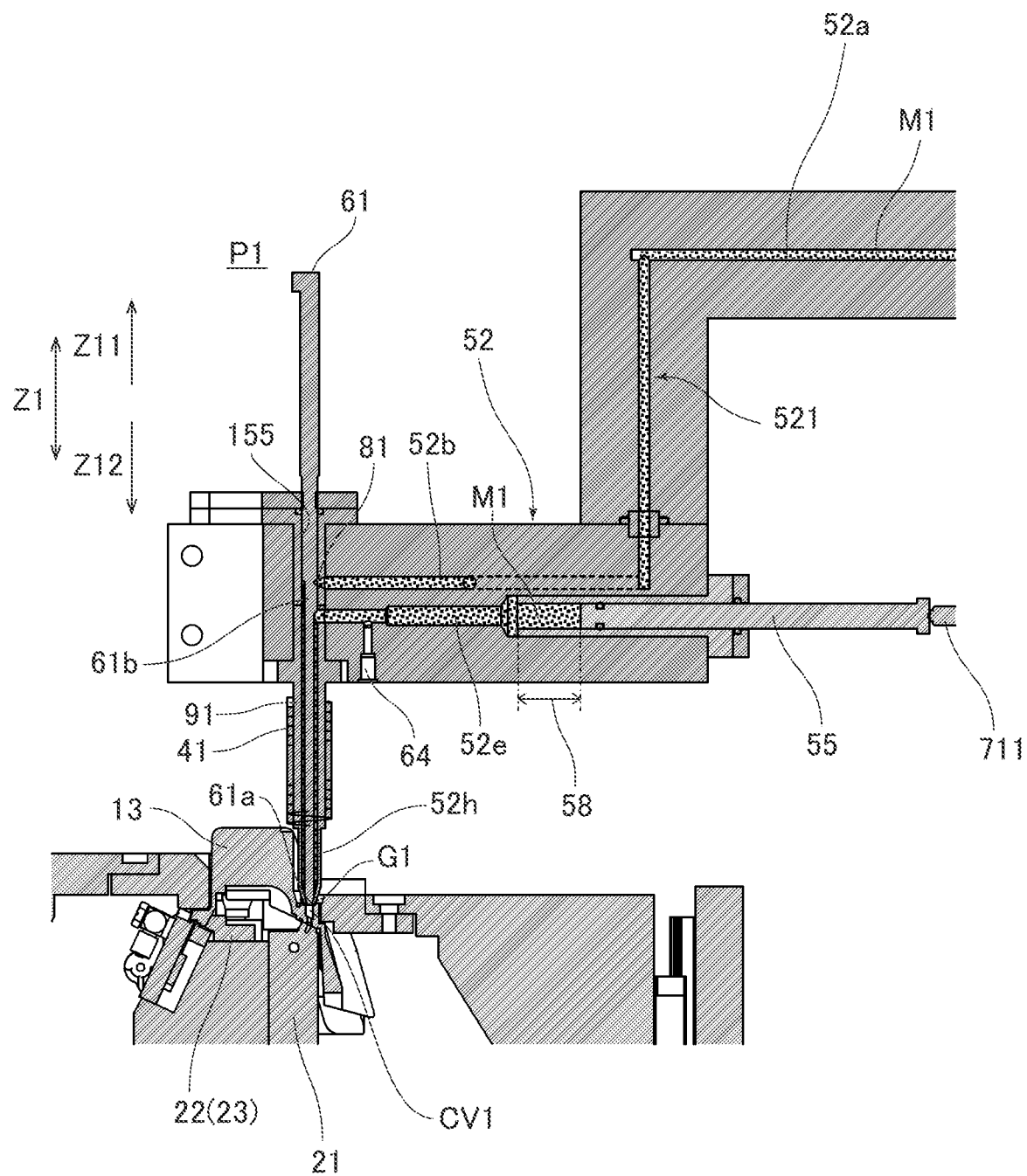
FIG. 12 is a longitudinal section view of the injection unit according to the first embodiment.

FIG. 12 is a longitudinal section view of the injection unit 100 according to the first embodiment. FIG. 12 illustrates a state in which the amount measuring step has been completed. As illustrated in FIG. 12, the plunger 55 is pressed by the molten resin M1, and thus moves back to come into contact with the pressing member 711. That is, when the molten resin M1 in the reserving portion 58 reaches a predetermined volume, the plunger 55 comes into contact with the pressing member 711. The predetermined volume is equal to the capacity of the cavity CV1. In the case where contact of the plunger 55 with the pressing member 711 is detected, the control apparatus 200 stops the rotation of the screw 50 of the plasticizing portion 49, and completes the amount measurement.

In the first embodiment, the plunger 55 is separated from the pressing member 711 of the driving mechanism 71. Therefore, in the amount measuring step, the plunger 55 does not need to be forcibly retracted. That is, the plunger 55 retracts as a result of the pressing force of the molten resin M1. If the plunger is forcibly retracted, there is a possibility that the capacity of the reserving portion suddenly increases, thus sudden pressure change occurs in the molten resin in the reserving portion, and the quality of the molten resin in the reserving portion changes, air is mixed in the molten resin, or the like. There is a possibility that a molding failure such as a void or a silver streak occurs in a molded article formed from the molten resin affected by the sudden pressure change.

In contrast, in the first embodiment, since the plunger 55 and the driving mechanism 71 are separated, the plunger 55 can be moved back by being pushed back by the molten resin M1 after the pressing member 711 of the driving mechanism 71 is retracted. As a result of this, occurrence of sudden pressure change of the molten resin M1 in the reserving portion 58 can be reduced. Therefore, change in the quality of the molten resin M1 or mixing of air in the molten resin M1 can be reduced, and thus a molded article of a good quality can be manufactured. In addition, it is preferable that either one or both of a contact portion of the plunger 55 and a contact portion of the pressing member 711 are spherical surfaces. As a result of this, even if the pressing member 711 moves forward in a slightly inclined state, the plunger 55 can move forward while correcting the inclination of the pressing member 711 so as to follow the inner wall of the cylinder. Therefore, the plunger 55 being caught by the inner wall of the cylinder, that is, occurrence of galling can be reduced.

To be noted, although it is preferable that the plunger 55 and the driving mechanism 71 are separated, the configuration is not limited to this, and the plunger 55 and the driving mechanism 71 may be connected. In addition, the plunger 55 may include a head portion that comes into contact with the molten resin, and a shaft portion separate from the head portion, and the shaft portion may be connected to the driving mechanism 71.

To be noted, the configuration and operation of members related to the resin channel 522 and the configuration and operation of members related to the resin channel 523 are substantially the same as the configuration and operation of members related to the resin channel 521. The valve pin 61, the plunger 55, and the driving mechanism 71 are members related to the resin channel 521. The valve pin 62, the plunger 56, and the driving mechanism 72 are members related to the resin channel 522. The valve pin 63, the plunger 57, and the driving mechanism 73 are members related to the resin channel 523. Therefore, molten resin is stably discharged from the discharge ports G1, G2, and G3.

Since the plungers 55, 56, and 57 are mutually individually driven by the driving portion 70, position control thereof can be individually performed, and the capacities of the reserving portions 58, 59, and 60 can be individually adjusted. As a result, the injection amount of resin can be adjusted for each of the discharge ports G1, G2, and G3. In addition, the plungers 55, 56, and 57 can stably discharge molten resin without being affected by the injection operation of each other.

In addition, the molten resin flowing back to the plasticizing portion 49 can be effectively suppressed at the valve pins 61, 62, and 63. In addition, the opening/closing timings of the valve pins 61, 62, and 63 affecting each other can be suppressed, and thus molten resin can be injected by a stable amount.

Here, as illustrated in FIG. 4, a pressure sensor 64 used for detecting the resin pressure in the partial channel 52e is provided in the partial channel 52e, and a pressure sensor 65 used for detecting the resin pressure in the partial channel 52f is provided in the partial channel 52f. The pressure sensor 64 is an example of a first pressure sensor. The pressure sensor 65 is an example of a second pressure sensor. To be noted, an unillustrated pressure sensor used for detecting the resin pressure in the partial channel 52g is provided in the partial channel 52g. The unillustrated pressure sensor is an example of a third pressure sensor. These pressure sensors are preferably disposed at positions where the sectional area in the channel is small.

The control apparatus 200 controls the driving of the plunger 55 by the driving portion 70 on the basis of a pressure value obtained by detection by the pressure sensor 64. Similarly, the control apparatus 200 controls the driving of the plunger 56 by the driving portion 70 on the basis of a pressure value obtained by detection by the pressure sensor 65. Similarly, the control apparatus 200 controls the driving of the plunger 57 by the driving portion 70 on the basis of a pressure value obtained by detection by the unillustrated pressure sensor.

In the first embodiment, the lengths of the branch channels 52b, 52c, and 52d are different from each other. For example, the length L1 and the length L2 illustrated in FIG. 4 are different from each other. Therefore, it can be considered that the timings at which the molten resin is respectively injected into the reserving portions 58, 59, and 60 also differ. Therefore, according to the first embodiment, by measuring the pressures in the vicinity of the reserving portions 58, 59, and 60, injection conditions corresponding to the pressure values can be set. In addition, by measuring the injection pressure at the time of injection by each of the plungers 55, 56, and 57, the driving conditions of the plungers 55, 56, and 57 can be set such that the injection pressures are equal. In the first embodiment, since the plungers 55, 56, and 57 and the driving mechanisms 71, 72, and 73 are provided in correspondence with the discharge ports G1, G2, and G3, the driving conditions of the plungers 55, 56, and 57 can be independently set. Therefore, the respective injection states of the molten resin injected from the discharge ports G1, G2, and G3 can be caused to match each other.

In the first embodiment, the cavities CV1, CV2, and CV3 are defined between the workpiece 13 and molds 21, 22, and 23 by bringing the molds 21, 22, and 23 into contact with the workpiece 13 molded from resin. The mold 21 is an example of a first mold. The mold 22 is an example of a second mold. The mold 23 is an example of a third mold. By injecting molten resin into the cavities CV1, CV2, and CV3, three molded articles are outsert-molded on the workpiece 13, and thus a product is manufactured.

Figure 13:
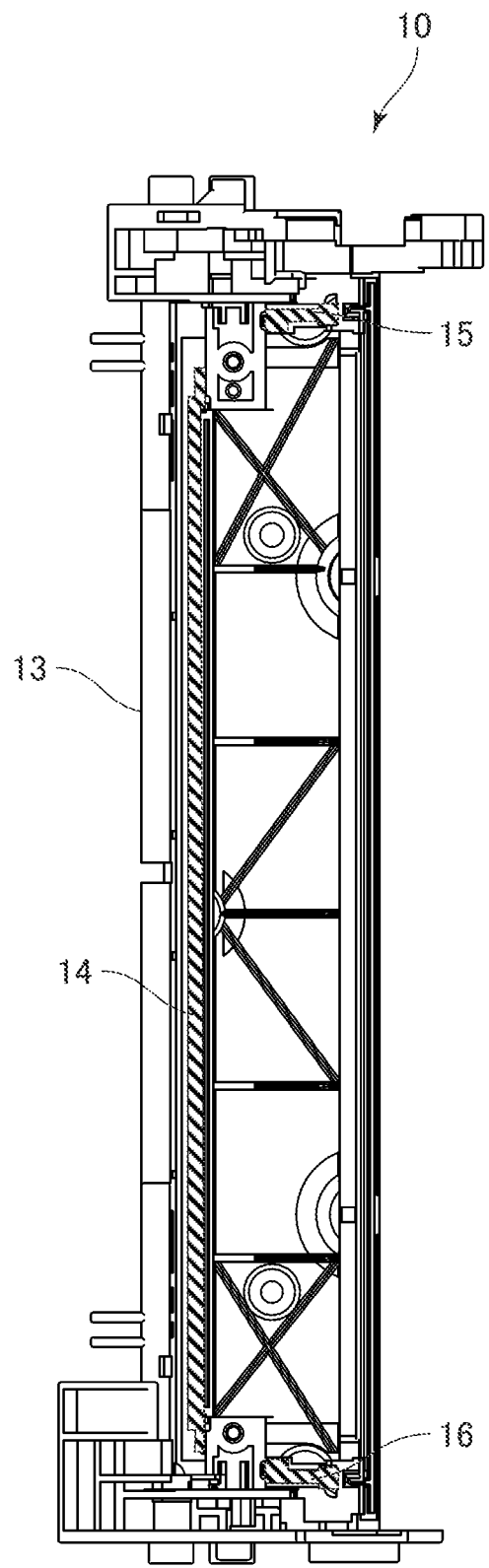
FIG. 13 is an explanatory diagram of a product according to the first embodiment.
Figure 14:
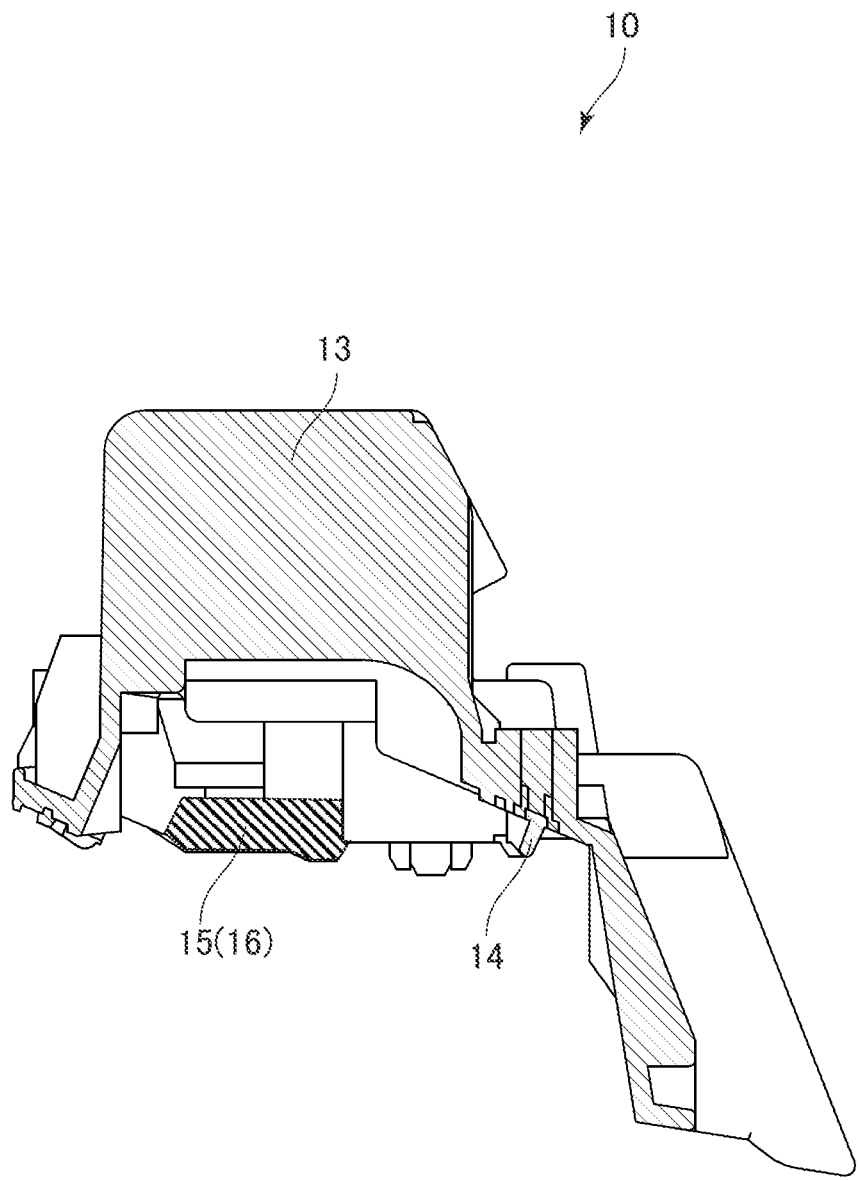
FIG. 14 is an explanatory diagram of the product according to the first embodiment.

FIGS. 13 and 14 are explanatory diagrams of a product 10 according to the first embodiment. FIG. 13 is a plan view of the product 10, and FIG. 14 is a section view of the product 10. In the first embodiment, members 14, 15, and 16 that are resin molded articles are outsert-molded on the workpiece 13, and thus a product 10 is manufactured. That is, the product 10 is manufactured by adding the members 14, 15, and 16 to the workpiece 13. The member 14 is a molded article molded in the cavity CV1, the member 15 is a molded article molded in the cavity CV2, and the member 16 is a molded article molded in the cavity CV3. The members 14, 15, and 16 are, for example, sealing members for sealing powder.

The member 14 has a different volume from the members 15 and 16. Therefore, the cavity CV1 of the mold 21 used for molding the member 14 has a different capacity from the cavity CV2 of the mold 22 used for molding the member 15. Similarly, the cavity CV1 of the mold 21 used for molding the member 14 has a different capacity from the cavity CV3 of the mold 23 used for molding the member 16.

The resin material used for the molding is preferably a resin that is suitable for a sealing member and can be molded by injection molding, such as a thermoplastic elastomer resin.

In the first embodiment, the positions of the plungers 55, 56, and 57 can be independently controlled, and the capacities of the reserving portions 58, 59, and 60 can be individually changed. That is, the resin reserving amounts of the reserving portions 58, 59, and 60 can be individually adjusted. As a result of this, molten resin can be stably injected from each of the discharge ports G1, G2, and G3, and the quality of the product 10 can be improved.

A manufacturing method for outsert-molding the members 14, 15, and 16 on the workpiece 13 will be briefly described. First, the workpiece 13 is attached to the holding member 30 illustrated in FIG. 1. The molds 21, 22, and 23 illustrated in FIG. 8 are disposed on the holding member 30.

An unillustrated conveyance stage on which the holding member 30 is placed can move in a mold clamping direction and a mold opening direction. The molds are clamped when the conveyance stage is moved in the mold clamping direction. As a result of the mold clamping, the discharge ports G1, G2, and G3 are connected to the cavities CV1, CV2, and CV3.

After the mold clamping, in the injection step, the control apparatus 200 moves the valve pins 61, 62, and 63 to open the discharge ports G1, G2, and G3. Then, the control apparatus 200 moves the plungers 55, 56, and 57 to reduce the capacities of the reserving portions 58, 59, and 60. As a result of this, the molten resin injected into the reserving portions 58, 59, and 60 is injected into the cavities CV1, CV2, and CV3 from the discharge ports G1, G2, and G3.

In the amount measuring step, the control apparatus 200 moves the valve pins 61, 62, and 63 to close the discharge ports G1, G2, and G3. In addition, the control apparatus 200 retracts the pressing members 711, 712, and 713 by a predetermined stroke in accordance with the capacities of the cavities CV1, CV2, and CV3. When molten resin is supplied to the reserving portions 58, 59, and 60 from the plasticizing portion 49, the plungers 55, 56, and 57 retract by being pressed by the molten resin. When the capacities of the reserving portions 58, 59, and 60 reach the capacities of the cavities CV1, CV2, and CV3, the plungers 55, 56, and 57 come into contact with the pressing members 711, 712, and 713. As a result of this, the amount measurement of the molten resin to be injected in the next injection step is completed.

In addition, after the injection step described above, a cooling step of cooling and solidifying the molten resin injected into the cavities CV1, CV2, and CV3 is executed in parallel with the amount measuring step. The discharge ports G1, G2, and G3 are closed in the amount measuring step, and by opening the molds in this state, the product 10 in which the members 14, 15, and 16 are formed on the workpiece 13 is taken out. By repeating the above operation, the products 10 are sequentially and efficiently manufactured. Further, since molten resin can be stably injected into the cavities CV1, CV2, and CV3, the quality of the product 10 to be manufactured is improved.

Second Embodiment

Figure 15:
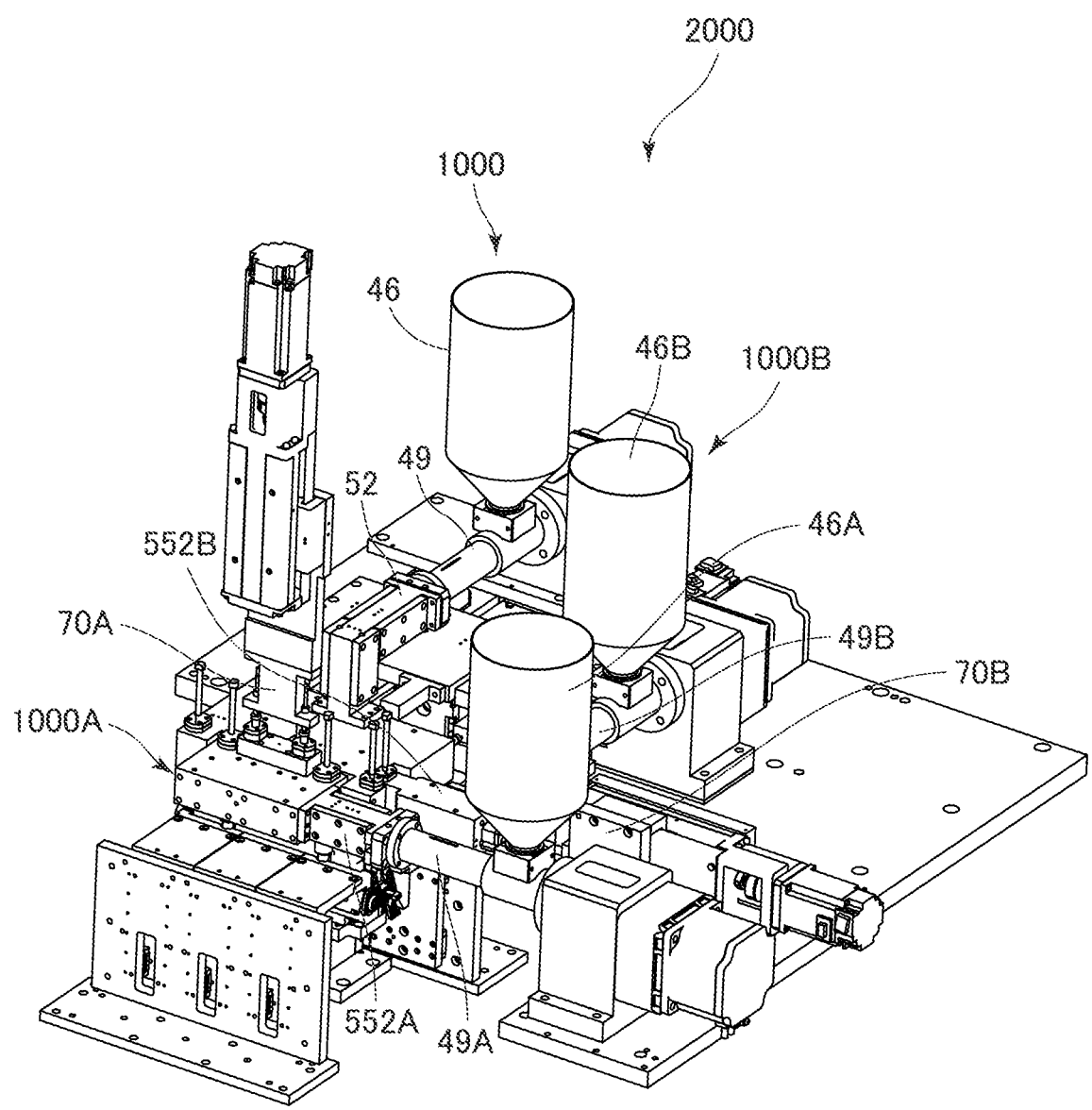
FIG. 15 is a perspective view of a manufacturing system according to a second embodiment.

A second embodiment will be described. In the second embodiment, description of elements substantially the same as in the first embodiment will be simplified or omitted. FIG. 15 is a perspective view of a manufacturing system 2000 according to the second embodiment. In the second embodiment, a case where the manufacturing system 2000 includes a plurality of manufacturing apparatuses will be described.

The manufacturing system 2000 includes the manufacturing apparatus 1000 described in the first embodiment, a manufacturing apparatus 1000A, and a manufacturing apparatus 1000B. Similarly to the manufacturing apparatus 1000, the manufacturing apparatus 1000A includes a plurality of resin channels, and a plurality of plungers corresponding to the plurality of reserving portions. For example, the manufacturing apparatus 1000A includes two resin channels, and two plungers corresponding to two reserving portions. The two resin channels each has an discharge port. To be noted, the manufacturing apparatus 1000B includes one resin channel, and one plunger corresponding to one reserving portion. That is, the manufacturing system 2000 includes two manufacturing apparatuses including a plurality of plungers.

The manufacturing apparatus 1000A includes a resin supply portion 46A, a plasticizing portion 49A, a defining portion 552A, and a driving portion 70A. The manufacturing apparatus 1000B includes a resin supply portion 46B, a plasticizing portion 49B, a defining portion 552B, and a driving portion 70B. The driving portion 70A is capable of driving the two plungers included in the manufacturing apparatus 1000A individually or in an interlocked manner. The driving portion 70B is capable of driving the one plunger included in the manufacturing apparatus 1000B.

To be noted, although the illustration thereof is omitted, the manufacturing system 2000 includes a control apparatus corresponding to the manufacturing apparatus 1000, a control apparatus corresponding to the manufacturing apparatus 1000A, and a control apparatus corresponding to the manufacturing apparatus 1000B, and these control apparatuses constitute a control system. The control system may be constituted by a single or a plurality of computers.

Figure 16:
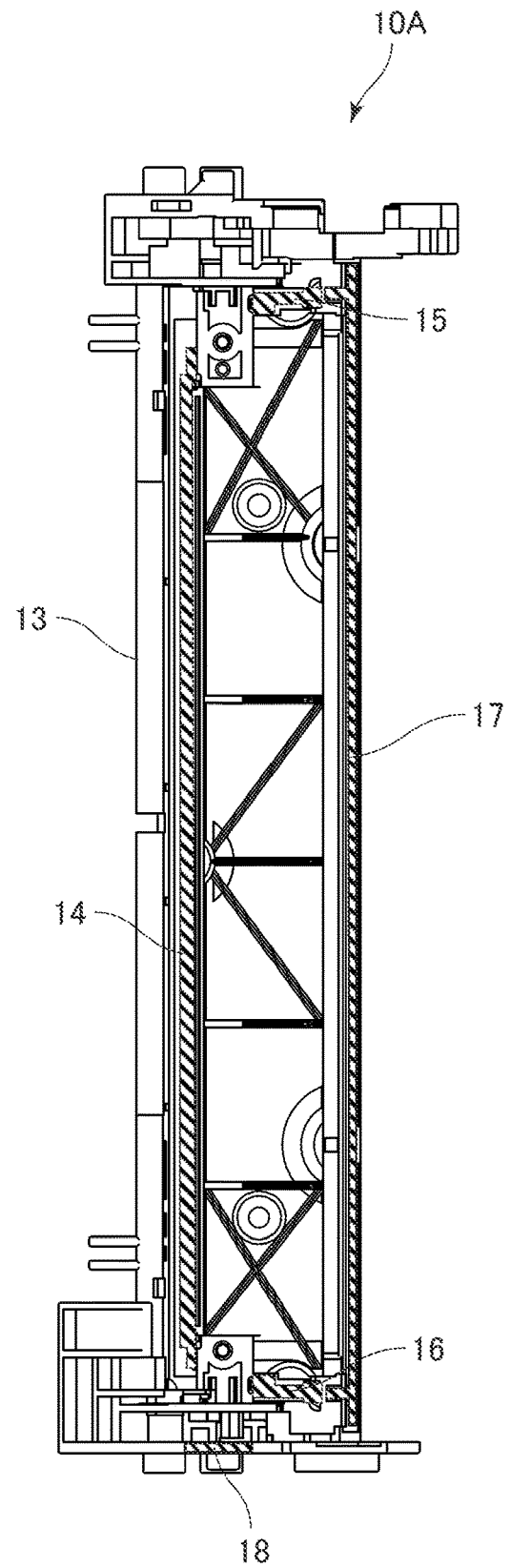
FIG. 16 is an explanatory diagram of a product according to the second embodiment.

FIG. 16 is an explanatory diagram of a product 10A according to the second embodiment. FIG. 16 is a plan view of the product 10A. The manufacturing apparatus 1000 molds the members 14, 15, and 16, the manufacturing apparatus 1000A molds a member 17, and the manufacturing apparatus 1000B molds a member 18. The member 17 is a member having an elongated shape, and is formed by injecting molten resin into a cavity connected to a plurality of discharge ports in the manufacturing apparatus 1000A. The members 17 and 18 can be molded from a different resin material from the members 14, 15, and 16.

As described above, also in the manufacturing apparatus 1000A, the stroke amount of the plurality of plungers can be appropriately set in accordance with the shape of the member 17 and the flowing characteristics of the resin when molding the member 17, and thus the molten resin can be stably injected. As a result of this, the quality of the product 10A to be manufactured is improved.

Third Embodiment

Figure 17:
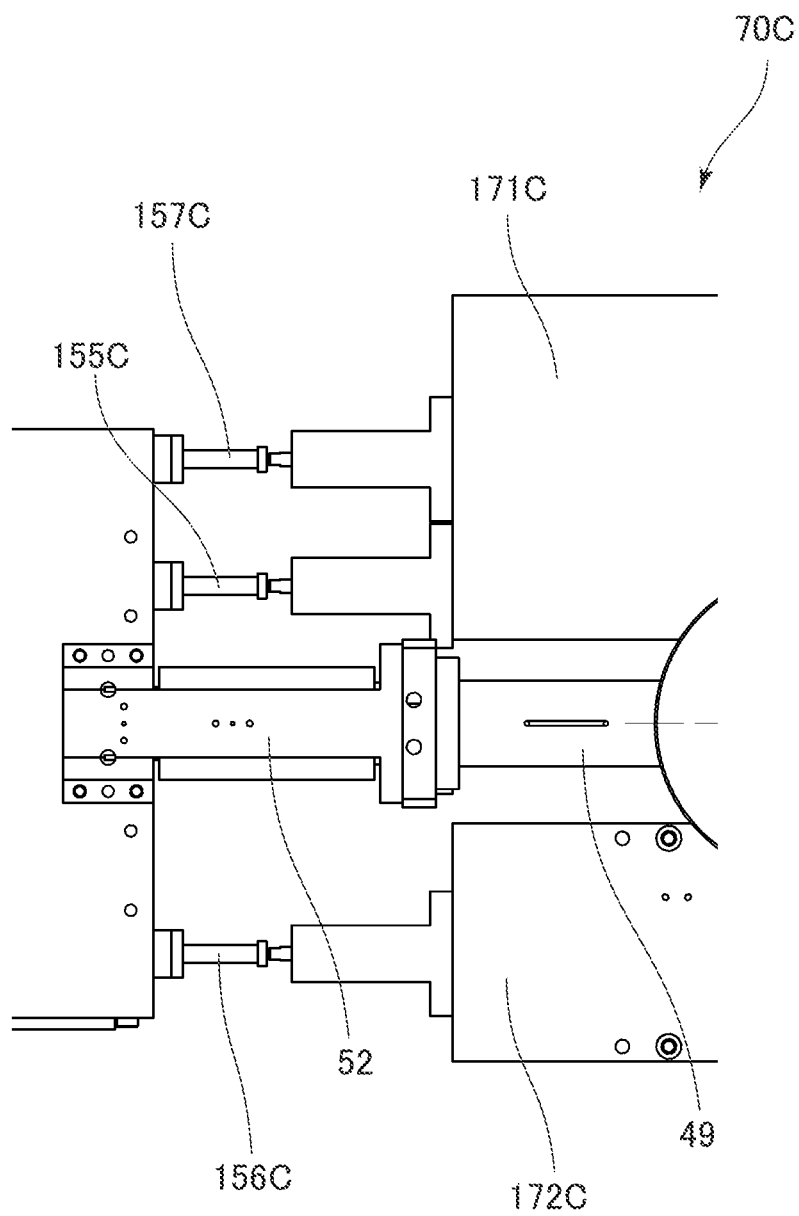
FIG. 17 is a plan view of part of a manufacturing apparatus according to a third embodiment.

A third embodiment will be described. In the third embodiment, description of elements substantially the same as in the first embodiment will be simplified or omitted. FIG. 17 is a plan view of part of a manufacturing apparatus according to a third embodiment.

The manufacturing apparatus of the third embodiment includes three plungers 155C, 156C, and 157C defined by the defining portion 52, branching from the plasticizing portion 49, and configured to inject resin, and a driving portion 70C. The driving portion 70C includes a driving mechanism 171C that drives the plungers 155C and 157C in an interlocked manner, and a driving mechanism 172C that drives the plunger 156C independently from the plungers 155C and 157C. The plungers 155C and 157C are both driven by the driving mechanism 171C.

If the capacities of two cavities into which molten resin is injected by the two plungers 155C and 157C are equal, the two plungers 155C and 157C can be driven by the single driving mechanism 171C.

In the example of the third embodiment, the capacity of the cavity into which molten resin is injected by the plunger 156C is different from the capacity of each of the two cavities into which the molten resin is injected by the two plungers 155C and 157C. In such a case, the plunger 156C may be configured to be driven by the driving mechanism 172C different from the driving mechanism 171C.

As described above, the stroke of each of the plungers 155C, 156C, and 157C can be appropriately set in consideration of the shape of the molded article to be molded and the flowing characteristics of the molten resin. Further, the molten resin injected into a reserving portion corresponding to each of the plungers 155C and 157C can be stably injected by a constant stroke.

To be noted, in the case where it is necessary to vary the injection amount between the plungers 155C and 157C, the injection amount can be adjusted by disposing a spacer between the plunger 155C or 157C and the driving mechanism 171C. For example, if the amount is measured in a state in which the spacer is disposed between the plunger 155C and the driving mechanism 171C and the spacer is removed at the time of injection, the injection amount can be varied between the plungers 155C and 157C. Alternatively, for example, if the amount is measured in a state in which the spacer is not disposed between the plunger 157C and the driving mechanism 171C, and the injection is performed in a state in which the spacer is disposed between the plunger 157C and the driving mechanism 171C at the time of injection, the injection amount can be varied between the plungers 155C and 157C.

Fourth Embodiment

Figure 18:
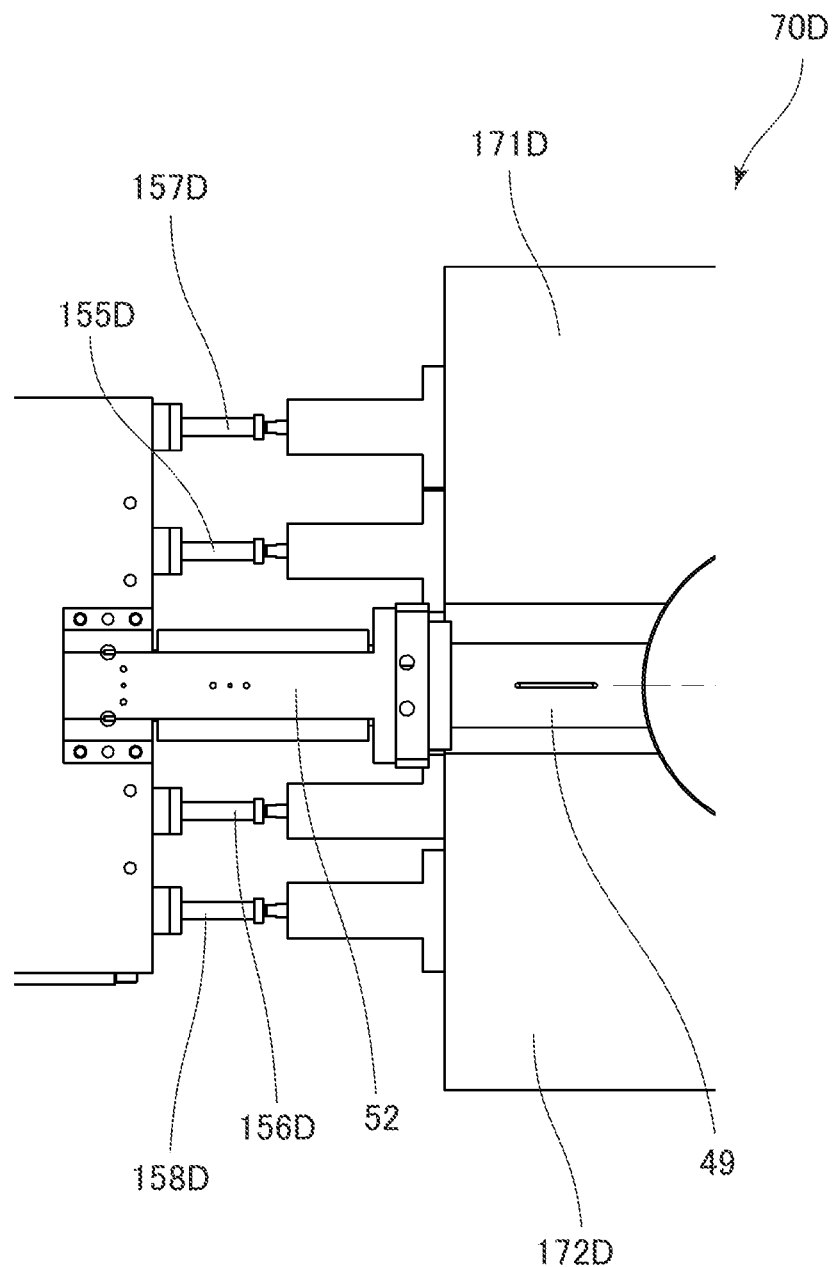
FIG. 18 is a plan view of part of a manufacturing apparatus according to a fourth embodiment.

A fourth embodiment will be described. In the fourth embodiment, description of elements substantially the same as in the first embodiment will be simplified or omitted. FIG. 18 is a plan view of part of a manufacturing apparatus according to a fourth embodiment.

The manufacturing apparatus of the fourth embodiment includes four plungers 155D, 156D, 157D, and 158D defined by the defining portion 52, branching from the plasticizing portion 49, and configured to inject resin, and a driving portion 70D. The driving portion 70D includes a driving mechanism 171D that drives the plungers 155D and 157D in an interlocked manner, and a driving mechanism 172D that drives the plungers 156D and 158D in an interlocked manner. The driving mechanism 171D drives the plungers 155D and 157D independently from the plungers 156D and 158D. The driving mechanism 172D drives the plungers 156D and 158D independently from the plungers 155D and 157D. The plungers 155D and 157D are both driven by the driving mechanism 171D, and the plungers 156D and 158D are both driven by the driving mechanism 172D.

If the capacities of two cavities into which molten resin is injected by the two plungers 155D and 157D are equal, the two plungers 155D and 157D can be driven by the single driving mechanism 171D.

If the capacities of two cavities into which molten resin is injected are equal, the two plungers 156D and 158D can be driven by the single driving mechanism 172D.

In the example of the fourth embodiment, the capacity of each of the two cavities into which molten resin is injected by the plungers 156D and 158D is different from the capacity of each of the two cavities into which the molten resin is injected by the two plungers 155D and 157D. In such a case, the plungers 156D and 158D may be configured to be driven by the driving mechanism 172D different from the driving mechanism 171D.

As described above, the stroke of each of the plungers 155D, 156D, 157D and 158D can be appropriately set in consideration of the shape of the molded article to be molded and the flowing characteristics of the molten resin. Further, the molten resin injected into a reserving portion corresponding to each of the plungers 155D and 157D can be stably injected by a constant stroke. In addition, the molten resin injected into a reserving portion corresponding to each of the plungers 156D and 158D can be stably injected by a constant stroke.

To be noted, in the case where it is necessary to vary the injection amount between the plungers 155D and 157D, the injection amount can be adjusted by disposing a spacer between the plunger 155D or 157D and the driving mechanism 171D.

To be noted, in the case where it is necessary to vary the injection amount between the plungers 156D and 158D, the injection amount can be adjusted by disposing a spacer between the plunger 156D or 158D and the driving mechanism 172D.

Fifth Embodiment

Figure 19:
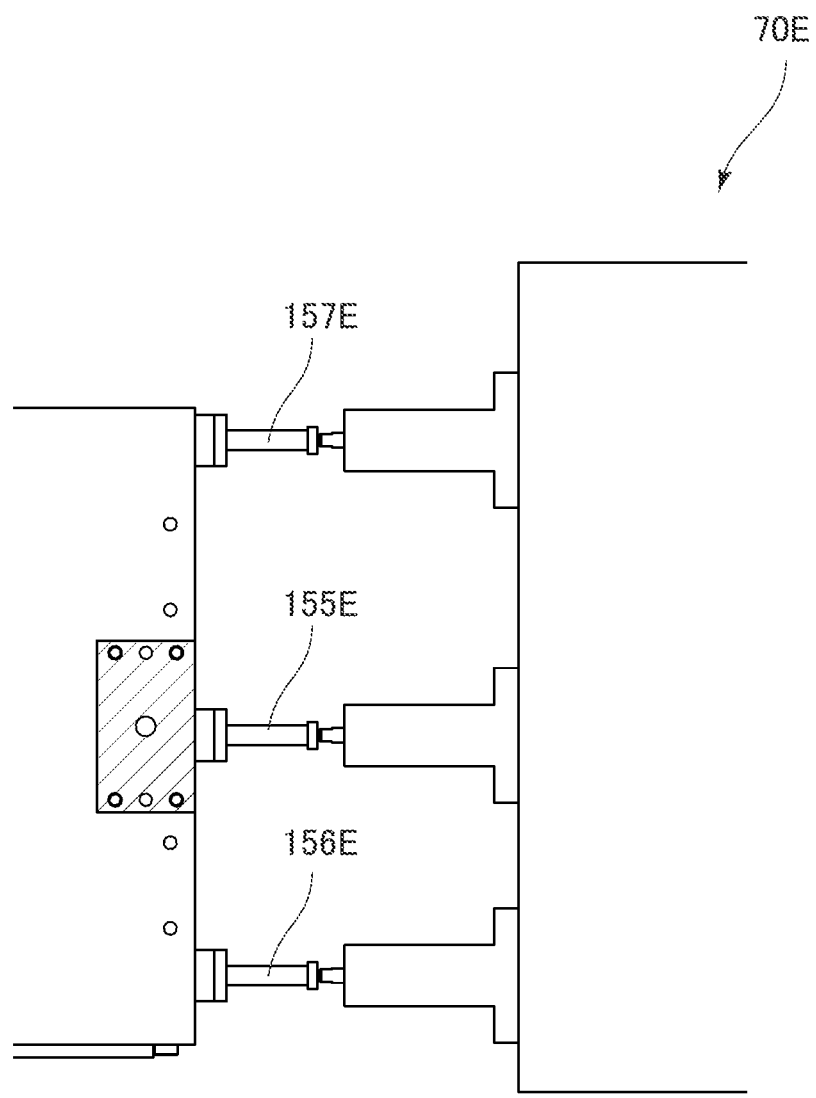
FIG. 19 is a plan view of part of a manufacturing apparatus according to a fifth embodiment.

A fifth embodiment will be described. In the fifth embodiment, description of elements substantially the same as in the first embodiment will be simplified or omitted. FIG. 19 is a plan view of part of a manufacturing apparatus according to a fifth embodiment.

The manufacturing apparatus of the fifth embodiment includes three plungers 155E, 156E, and 157E defined by a defining portion, branching from a plasticizing portion, and configured to inject resin, and a driving portion 70E. The driving portion 70E is a driving mechanism that drives the plungers 155E, 156E, and 157E in an interlocked manner. The plungers 155E, 156E, and 157E are all driven by the driving portion 70E.

If the capacities of three cavities into which molten resin is injected by the three plungers 155E to 157E are equal, the three plungers 155E to 157E can be driven by the single driving portion 70E.

As described above, the stroke of each of the plungers 155E to 157E can be appropriately set in consideration of the shape of the molded article to be molded and the flowing characteristics of the molten resin. Further, the molten resin injected into a reserving portion corresponding to each of the plungers 155E to 157E can be stably injected by a constant stroke.

To be noted, in the case where it is necessary to vary the injection amount between the plungers 155E to 157E, the injection amount can be adjusted by disposing a spacer between any of the plungers and the driving portion 70E.

Sixth Embodiment

Figure 20:
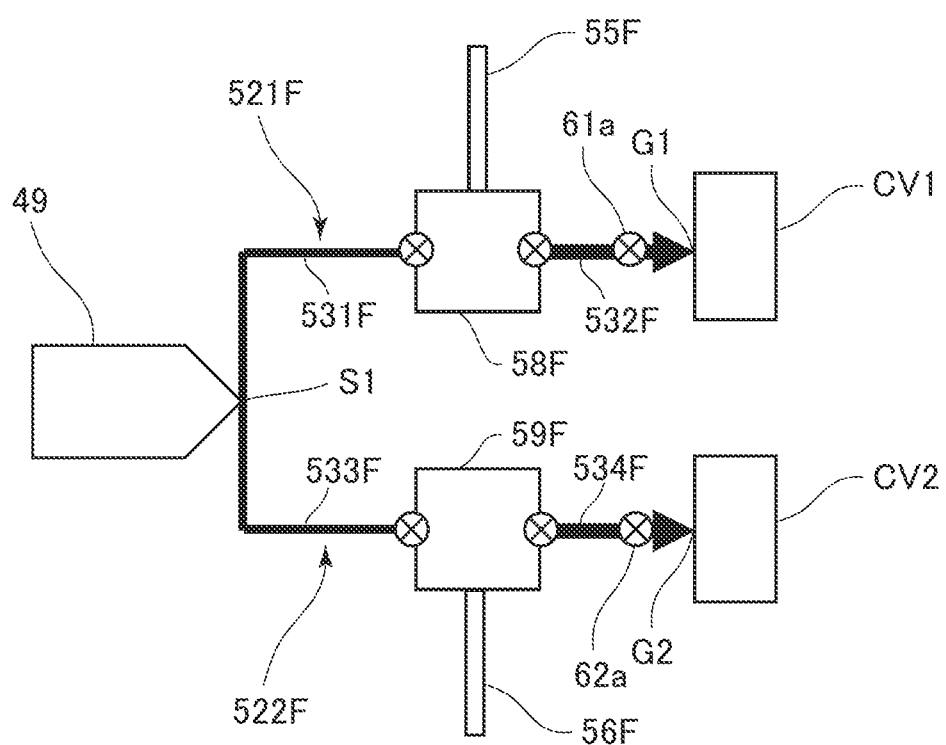
FIG. 20 is an explanatory diagram of two resin channels of a manufacturing apparatus according to a sixth embodiment.

A sixth embodiment will be described. In the sixth embodiment, description of elements substantially the same as in the first embodiment will be simplified or omitted. FIG. 20 is an explanatory diagram of two resin channels 521F and 522F of a manufacturing apparatus according to the sixth embodiment. The configuration of the resin channels in the sixth embodiment is different from the first embodiment.

The manufacturing apparatus of the sixth embodiment includes the plasticizing portion 49, a defining portion that defines two resin channels 521F and 522F, and two plungers 55F and 56F. The resin channels 521F and 522F do not have a main channel shared therebetween, and is configured to directly branch from the supply port S1 connected to the plasticizing portion 49.

The resin channel 521F is an example of a first resin channel connecting the supply port S1 connected to the plasticizing portion 49 and the discharge port G1. The resin channel 522F is an example of a second resin channel connecting the supply port S1 connected to the plasticizing portion 49 and the discharge port G2. Similarly to the first embodiment, the discharge port G1 is connected to the cavity CV1, and the discharge port G2 is connected to the cavity CV2. The plunger 55F is an example of a first plunger. The plunger 56F is an example of a second plunger.

The resin channel 521F includes a reserving portion 58F, a partial channel 531F, and a partial channel 532F. The reserving portion 58F is an example of a first reserving portion, and is a space capable of reserving molten resin supplied from the supply port S1 connected to the plasticizing portion 49. The partial channel 531F is an example of a first partial channel, and is a channel connecting the reserving portion 58F and the supply port S1 connected to the plasticizing portion 49. The partial channel 532F is an example of a second partial channel, and is a channel connecting the reserving portion 58F and the discharge port G1.

The resin channel 522F includes a reserving portion 59F, a partial channel 533F, and a partial channel 534F. The reserving portion 59F is an example of a second reserving portion, and is a space capable of reserving molten resin supplied from the supply port S1 connected to the plasticizing portion 49. The partial channel 533F is an example of a third partial channel, and is a channel connecting the reserving portion 59F and the supply port S1 connected to the plasticizing portion 49. The partial channel 534F is an example of a fourth partial channel, and is a channel connecting the reserving portion 59F and the discharge port G2.

The plunger 55F is capable of moving to reduce the capacity of the reserving portion 58E The plunger 55F moves to reduce the capacity of the reserving portion 58F, and thus the molten resin reserved in the reserving portion 58 is injected into the cavity CV1 from the discharge port G1 via the partial channel 532F.

The plunger 56F is capable of moving to reduce the capacity of the reserving portion 59F. The plunger 56F moves to reduce the capacity of the reserving portion 59F, and thus the molten resin reserved in the reserving portion 59 is injected into the cavity CV2 from the discharge port G2 via the partial channel 534F.

Also in the configuration of the resin channels 521F and 522F described above, similarly to the first embodiment, the molten resin can be stably injected from each of the discharge ports G1 and G2, and thus the quality of the product to be manufactured can be improved.

As described above, according to the present disclosure, the quality of the product to be manufactured is improved.

The present disclosure is not limited to the embodiments described above, and embodiments can be modified in many ways within the technical concept of the present disclosure. In addition, the effects described in the embodiments are merely enumeration of the most preferable effects that can be obtained from embodiments of the present disclosure, and effects of embodiments of the present disclosure are not limited to those described in the embodiments.

For example, the manufacturing apparatus may be configured such that a plurality of discharge ports are respectively connected to a plurality of cavities, or a plurality of discharge ports are connected to one cavity. The plurality of cavities may be defined by one mold, or may be respectively defined by a plurality of molds. In addition, part of each of the plurality of cavities or part of the single cavity may be defined by a workpiece.

Furthermore, the contents of disclosure in the present specification include not only contents described in the present specification but also all of the items which are understandable from the present specification and the drawings accompanying the present specification. Moreover, the contents of disclosure in the present specification include a complementary set of concepts described in the present specification. Thus, if, in the present specification, there is a description indicating that, for example, "A is B", even when a description indicating that "A is not B" is omitted, the present specification can be said to disclose a description indicating that "A is not B". This is because, in a case where there is a description indicating that "A is B", taking into consideration a case where "A is not B" is a premise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-46727, filed Mar. 23, 2022, which is hereby incorporated by reference herein in its entirety.

What is claimed is:

1. A manufacturing apparatus comprising:
   a defining portion configured to define (i) a supply port through which molten resin is supplied, (ii) a discharge port through which molten resin is discharged, and (iii) a resin channel connecting the supply port and the discharge port, the resin channel including a reserving portion configured to reserve molten resin, a first partial channel through which molten resin from the supply port passes, a second partial channel connected to the discharge port and through which molten resin from the reserving portion passes, a relay channel connected to the second partial channel and the reserving portion and through which molten resin that has passed through the first partial channel passes, and a connecting channel connecting the first partial channel and the second partial channel;
   a plunger that is movable to change a capacity of the reserving portion and configured to discharge molten resin reserved in the reserving portion from the discharge port by moving to reduce the capacity of the reserving portion; and
   a valve member provided in the connecting channel and the second partial channel and movable in a channel direction of the second partial channel,
   wherein the valve member includes:
   a first valve portion configured to open and close the discharge port by moving in the channel direction; and
   a second valve portion configured to, in a case where the first valve portion has moved to a position to close the discharge port, open a resin exit of the first partial channel such that the first partial channel communicates with the relay channel allowing molten resin to move into the reserving portion, and in a case where the first valve portion has moved to a position to open the discharge port, close the resin exit of the first partial channel allowing molten resin in the reserving portion to move to the discharge port.

2. The manufacturing apparatus according to claim 1, wherein the second valve portion has an outer peripheral surface that is in contact with an inner peripheral surface of the defining portion so as to be slidable in the channel direction, and that is configured to open and close the resin exit of the first partial channel by moving in the channel direction.

3. A manufacturing apparatus comprising:
a defining portion configured to define (i) a supply port through which molten resin is supplied, (ii) a first discharge port through which molten resin is discharged, (iii) a second discharge port through which molten resin is discharged, (iv) a first resin channel connecting the supply port and the first discharge port, and (v) a second resin channel connecting the supply port and the second discharge port, the first resin channel including a first reserving portion configured to reserve molten resin, the second resin channel including a second reserving portion configured to reserve molten resin;
a first plunger that is movable to change a capacity of the first reserving portion and configured to discharge molten resin reserved in the first reserving portion from the first discharge port by moving to reduce the capacity of the first reserving portion;
a second plunger that is movable to change a capacity of the second reserving portion and configured to discharge molten resin reserved in the second reserving portion from the second discharge port by moving to reduce the capacity of the second reserving portion;
a first valve member; and
a second valve member,
wherein the first resin channel includes a first partial channel through which molten resin from the supply port passes, a second partial channel connected to the first discharge port and through which molten resin from the first reserving portion passes, and a first relay channel connected to the second partial channel and the first reserving portion and through which molten resin that has passed through the first partial channel passes,
the second resin channel includes a third partial channel through which molten resin from the supply port passes, a fourth partial channel connected to the second discharge port and through which molten resin from the second reserving portion passes, and a second relay channel connected to the fourth partial channel and the second reserving portion and through which molten resin that has passed through the third partial channel passes,
the first plunger discharges molten resin reserved in the first reserving portion from the first discharge port via the first relay channel and the second partial channel by moving to reduce a capacity of the first reserving portion,
the second plunger discharges molten resin reserved in the second reserving portion from the second discharge port via the second relay channel and the fourth partial channel by moving to reduce a capacity of the second reserving portion,
the first valve member includes a first valve portion configured to open and close the first discharge port in a case where the first valve member moves, and a second valve portion configured to, in a case where the first valve portion has moved to a position to close the first discharge port, open a resin exit of the first partial channel such that the first partial channel communicates with the first relay channel allowing molten resin to move into the first reserving portion, and in a case where the first valve portion has moved to a position to open the first discharge port, close the resin exit of the first partial channel allowing molten resin in the first reserving portion to move to the first discharge port,
the second valve member includes a third valve portion configured to open and close the second discharge port in a case where the second valve member moves, and a fourth valve portion configured to, in a case where the third valve portion has moved to a position to close the second discharge port, open a resin exit of the third partial channel such that the third partial channel communicates with the second relay channel allowing molten resin to move into the second reserving portion, and in a case where the third valve portion has moved to a position to open the second discharge port, close the exit of the third partial channel allowing molten resin in the second reserving portion to move to the second discharge port, and
the first partial channel is longer than the third partial channel.

4. The manufacturing apparatus according to claim 3, wherein the first relay channel is defined such that a sectional area thereof increases toward the first reserving portion, and
the second relay channel is defined such that a sectional area thereof increases toward the second reserving portion.

5. The manufacturing apparatus according to claim 3, wherein the first resin channel includes a connecting channel connecting the first partial channel and the second partial channel,
the first valve member is provided in the connecting channel and the second partial channel and is movable in a channel direction of the second partial channel,
the first partial channel and the first relay channel are connected to the connecting channel so as to intersect with the connecting channel, and
the first valve member opens and closes the first discharge port by moving in the channel direction.

6. The manufacturing apparatus according to claim 5, wherein the second valve portion includes an outer peripheral surface that is in contact with an inner peripheral surface of the defining portion so as to be slidable in the channel direction and that opens and closes the resin exit of the first partial channel by moving in the channel direction.

7. The manufacturing apparatus according to claim 3, further comprising:
a driving portion configured to individually drive the first plunger and the second plunger;
a first pressure sensor configured to detect a resin pressure in the first relay channel;
a second pressure sensor configured to detect a resin pressure in the second relay channel; and
a controller configured to control driving of the first plunger by the driving portion on a basis of a pressure value obtained by detection by the first pressure sensor, and configured to control driving of the second plunger by the driving portion on a basis of a pressure value obtained by detection by the second pressure sensor.

8. The manufacturing apparatus according to claim 3, wherein a total length of the first partial channel and the first relay channel is different from a total length of the third partial channel and the second relay channel.

9. The manufacturing apparatus according to claim 3, further comprising:
a first heater disposed along the second partial channel; and
a second heater disposed along the fourth partial channel, wherein the first heater is longer than the second heater.

10. The manufacturing apparatus according to claim 3, wherein the first partial channel and the third partial channel are each connected to a main channel shared by the first resin channel and the second resin channel and connected to the supply port,
the first partial channel includes a first branch channel branching from the main channel so as to be not linearly connected to the main channel, and
the third partial channel includes a second branch channel branching from the main channel so as to be not linearly connected to the main channel.

11. The manufacturing apparatus according to claim 3, further comprising a driving portion configured to individually drive the first plunger and the second plunger.

12. The manufacturing apparatus according to claim 3, further comprising a driving portion configured to drive the first plunger and the second plunger in an interlocked manner.

13. The manufacturing apparatus according to claim 3, wherein the defining portion further defines a third resin channel including a third reserving portion configured to reserve molten resin and connecting the supply port and a third discharge port, and the manufacturing apparatus further comprises:
a third plunger that is movable to change a capacity of the third reserving portion and configured to discharge molten resin reserved in the third reserving portion from the third discharge port by moving to reduce the capacity of the third reserving portion; and
a driving portion configured to drive the first plunger and the third plunger in an interlocked manner.

14. The manufacturing apparatus according to claim 3, further comprising:
a first pressing member capable of being separated from the first plunger and capable of pressing the first plunger so as to reduce a capacity of the first reserving portion; and
a second pressing member capable of being separated from the second plunger and capable of pressing the second plunger so as to reduce a capacity of the second reserving portion.

15. The manufacturing apparatus according to claim 3, further comprising a plasticizing portion connected to the supply port and configured to melt resin.

16. A manufacturing system comprising:
the manufacturing apparatus according to claim 15; and
a plurality of plasticizing portions including the plasticizing portion.

17. The manufacturing apparatus according to claim 1, wherein the first partial channel and the relay channel are connected to the connecting channel so as to intersect with the connecting channel.

18. The manufacturing apparatus according to claim 1, wherein the valve member is moved back and forth in one direction of the channel direction to control whether to allow molten resin to move to the reserving portion or the discharge port.

19. The manufacturing apparatus according to claim 1, further comprising a plasticizing portion connected to the supply port and configured to melt resin, wherein the first valve portion moves to a position that opens the discharge port to close the resin exit of the first partial channel, thereby suppressing molten resin from flowing back into the plasticizing section.

20. The manufacturing apparatus according to claim 1, wherein the valve member defines a space for the first partial channel to communicate with the relay channel in the case where the first valve portion is moved to the position to close the discharge port.

21. A manufacturing method for a product, the manufacturing method comprising manufacturing the product by the manufacturing apparatus according to claim 1.

22. A manufacturing method for a product, the manufacturing method comprising manufacturing the product by the manufacturing apparatus according to claim 3, wherein resin discharged from the first discharge port and resin discharged from the second discharge port are added to a single workpiece.

23. A manufacturing method for a product, the manufacturing method comprising manufacturing the product by the manufacturing system according to claim 16.

* * * * *